July 3, 1951 I. MOLNAR 2,559,165

CARRIER CURRENT TELEPHONE SYSTEM

Filed Feb. 14, 1947 7 Sheets-Sheet 1

Inventor
Imre Molnar
By
Davis, Lindsey, Smith & Shoots
Attorneys

July 3, 1951 I. MOLNAR 2,559,165

CARRIER CURRENT TELEPHONE SYSTEM

Filed Feb. 14, 1947 7 Sheets-Sheet 2

Inventor
Imre Molnar
By
Davis, Lindsey, Smith & Shonts
Attorneys

July 3, 1951 I. MOLNAR 2,559,165

CARRIER CURRENT TELEPHONE SYSTEM

Filed Feb. 14, 1947 7 Sheets-Sheet 3

Inventor
Imre Molnar
By
Davis, Lindsey, Smith & Shonts
Attorneys

CARRIER CURRENT TELEPHONE SYSTEM

Filed Feb. 14, 1947 7 Sheets-Sheet 4

Inventor
Imre Molnar
By *Davis, Lindsey, Smith & Shonts*
Attorneys

July 3, 1951 I. MOLNAR 2,559,165

CARRIER CURRENT TELEPHONE SYSTEM

Filed Feb. 14, 1947 7 Sheets-Sheet 5

Inventor
Imre Molnar
By
Davis, Lindsey, Smith & Shonts
Attorneys

Inventor
Imre Molnar

By Davis, Lindsey, Smith & Shonts
Attorneys

July 3, 1951 I. MOLNAR 2,559,165

CARRIER CURRENT TELEPHONE SYSTEM

Filed Feb. 14, 1947 7 Sheets-Sheet 7

Inventor
Imre Molnar
By
Davis, Lindsey, Smith & Shonts
Attorneys

Patented July 3, 1951

2,559,165

UNITED STATES PATENT OFFICE 2,559,165

CARRIER CURRENT TELEPHONE SYSTEM

Imre Molnar, Chicago, Ill., assignor to Automatic Electric Laboratories, Inc., Chicago, Ill., a corporation of Delaware Application February 14, 1947, Serial No. 728,422

32 Claims. (Cl. 179—27)

The present invention relates to carrier current telephone systems and more particularly to such systems incorporating carrier current units permitting improved duplex control and supervision.

It is an object of the invention to provide an improved carrier current telephone system incorporating carrier current units, each unit being provided with separate transmitting and receiving signal channels and separate transmitting and receiving communication channels, whereby the transmission and reception of straight carrier signals for signaling purposes in no way interfere with the transmission and reception of modulated carrier signals for communication purposes.

Another object of the invention is to provide in a telephone system improved trunk circuits utilizing carrier current equipment and permitting the setting up and subsequent release of telephone connections in a straightforward manner.

A further object of the invention is to provide in a telephone system comprising two exchanges, each including an operator switchboard, an improved arrangement utilizing carrier current equipment for setting up connections between the operator switchboards.

A further object of the invention is to provide in a telephone system comprising a first exchange including an operator switchboard and a second exchange including automatic switching apparatus and a plurality of substations, an improved arrangement utilizing carrier current equipment for setting up connections from the operator switchboard by way of the switching apparatus to the subscriber substations and for setting up connections from the subscriber substations by way of the switching apparatus to the operator switchboard.

A still further object of the invention is to provide in a telephone system comprising two exchanges, each including automatic switching apparatus and a plurality of subscriber substations, an improved arrangement utilizing carrier current equipment for setting up connections from calling subscriber substations in either of the exchanges by way of the switching apparatus in the two exchanges to call subscriber substations in the other of the exchanges.

Further features of the invention pertain to the particular arrangement of the circuit elements of the system, whereby the above-outlined and additional operating features thereof are attained.

Figure 2:
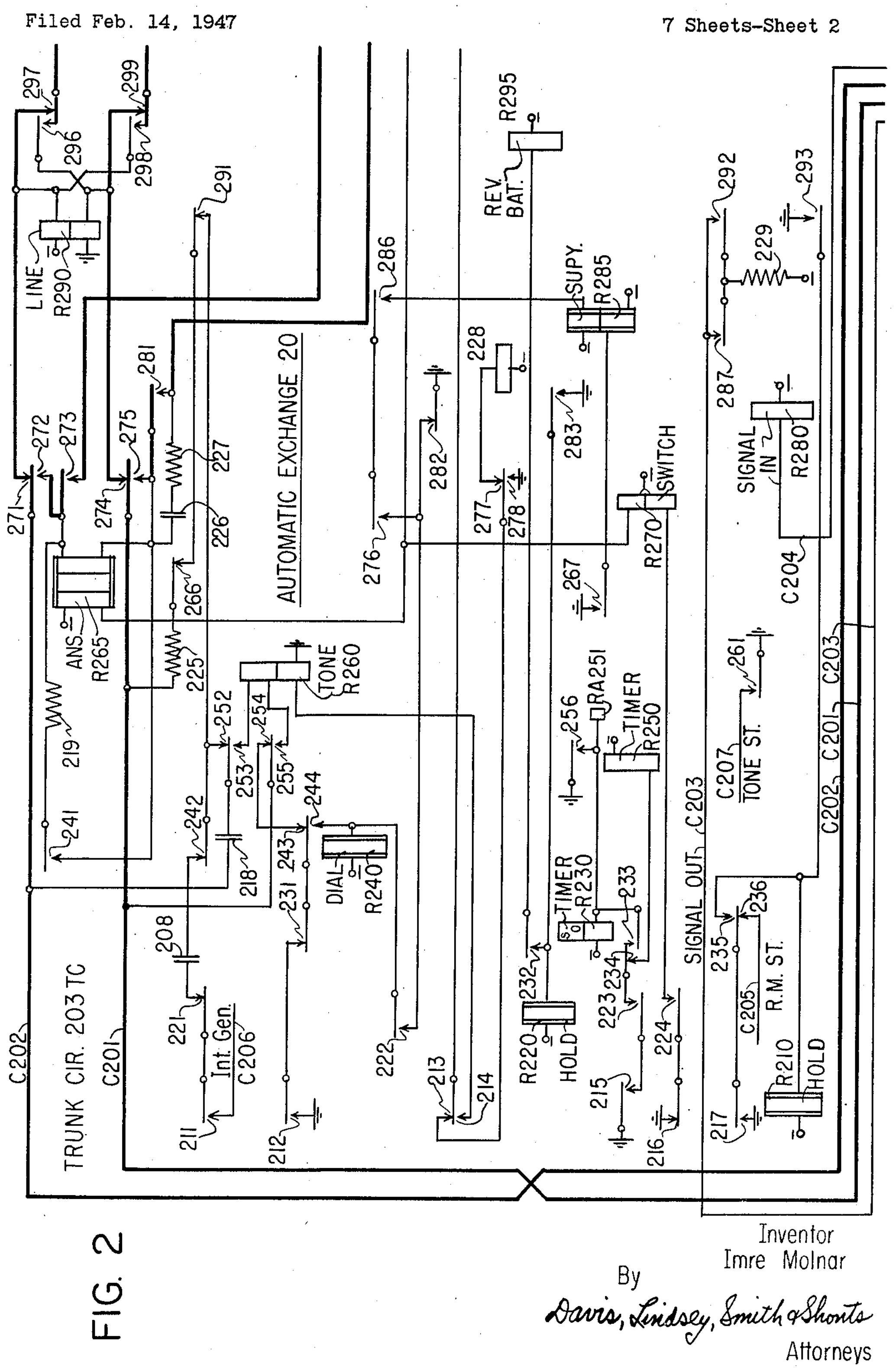
Figures 3, 6:
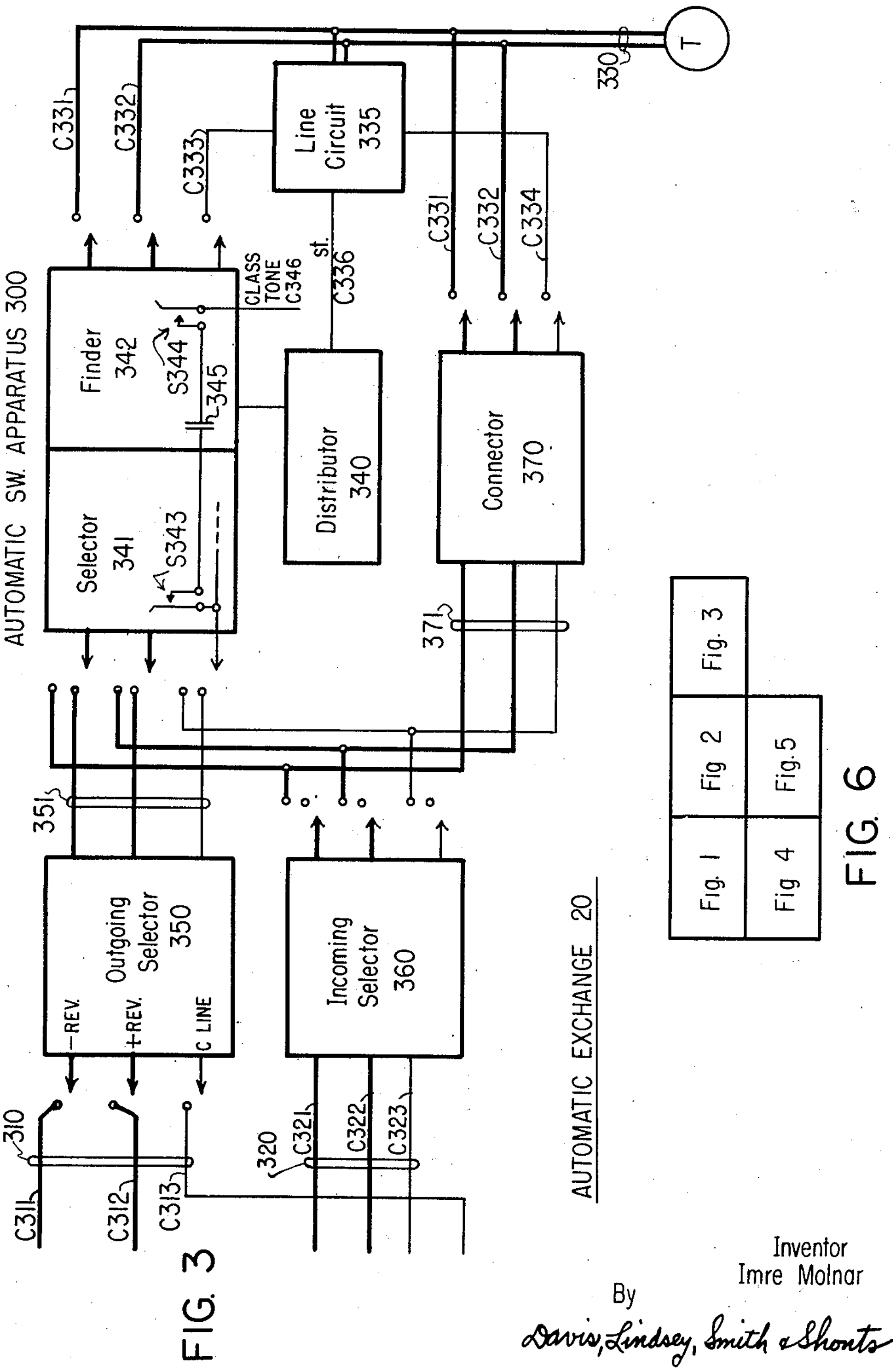
Figure 7:
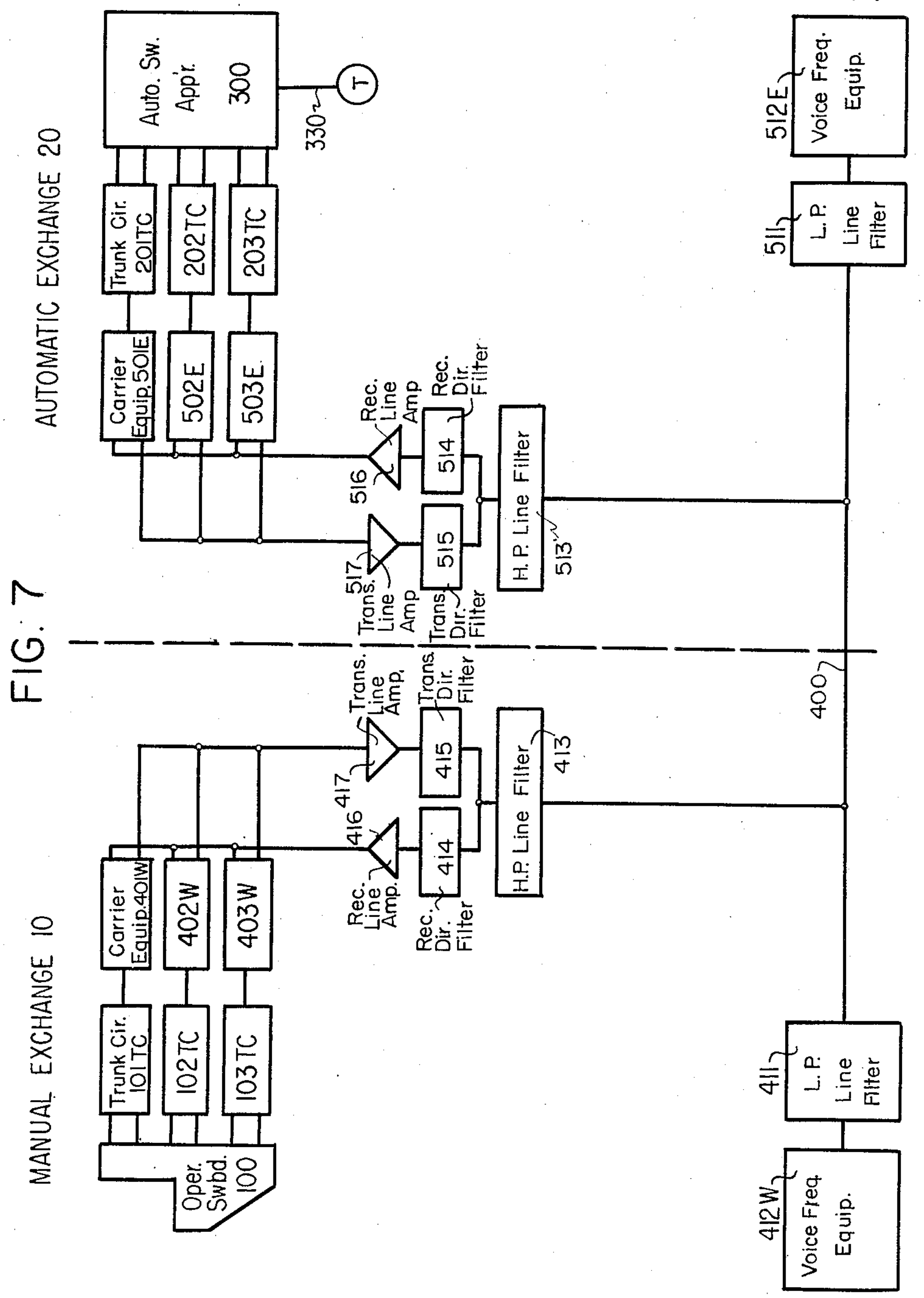
Figure 8:
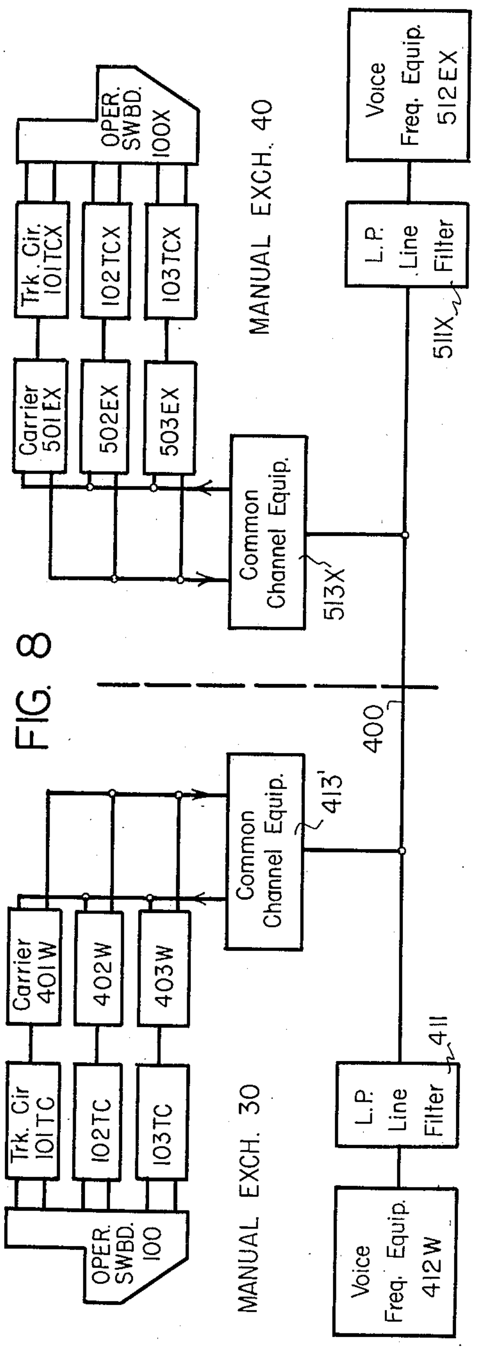
Figure 9:
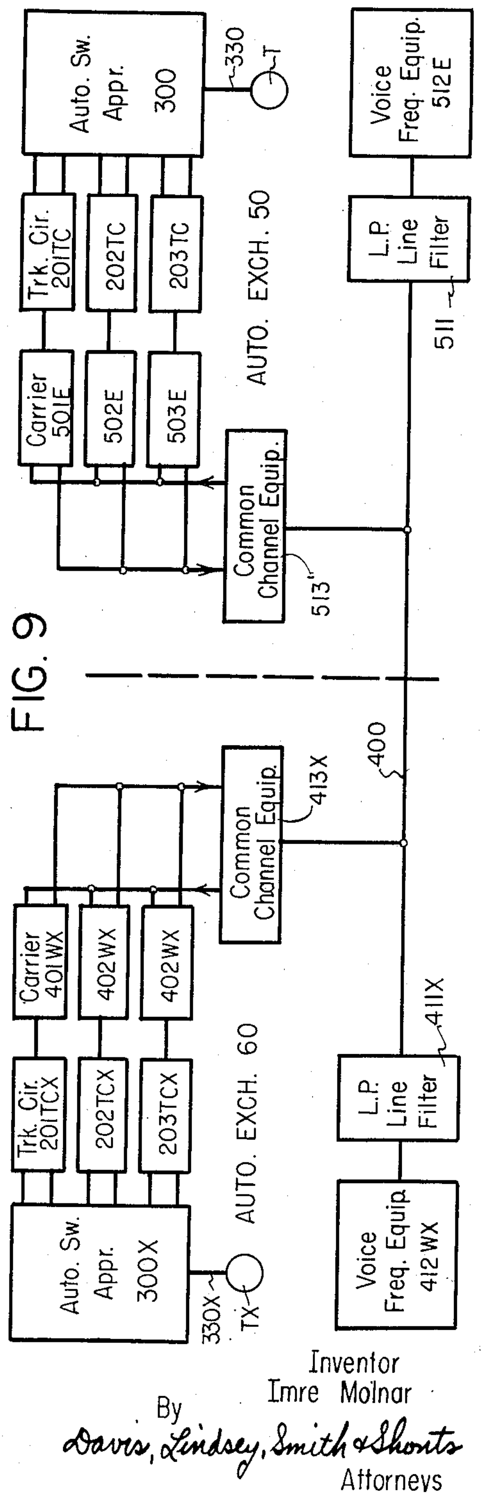

The invention, both as to its organization and method of operation, together with further objects and advantages thereof, will best be understood by reference to the following specification taken in connection with the accompanying drawings in which Figure 7 is a diagrammatic illustration of a telephone system embodying the present invention and comprising a manual exchange 10 and an automatic exchange 20; Fig. 8 is a diagrammatic illustration of a modified telephone system embodying the present invention and comprising a manual exchange 30 and a manual exchange 40; Fig. 9 is a diagrammatic illustration of a further modified telephone system embodying the present invention and comprising an automatic exchange 50 and an automatic exchange 60; Figs. 1 to 5, inclusive, taken together illustrate the details of the apparatus incorporated in the telephone system illustrated in Fig. 7 and embodying the features of the invention as briefly outlined above; and Fig. 6 illustrates the mode of combining Figs. 1 to 5, inclusive, to form a unified diagram.

Figure 1:
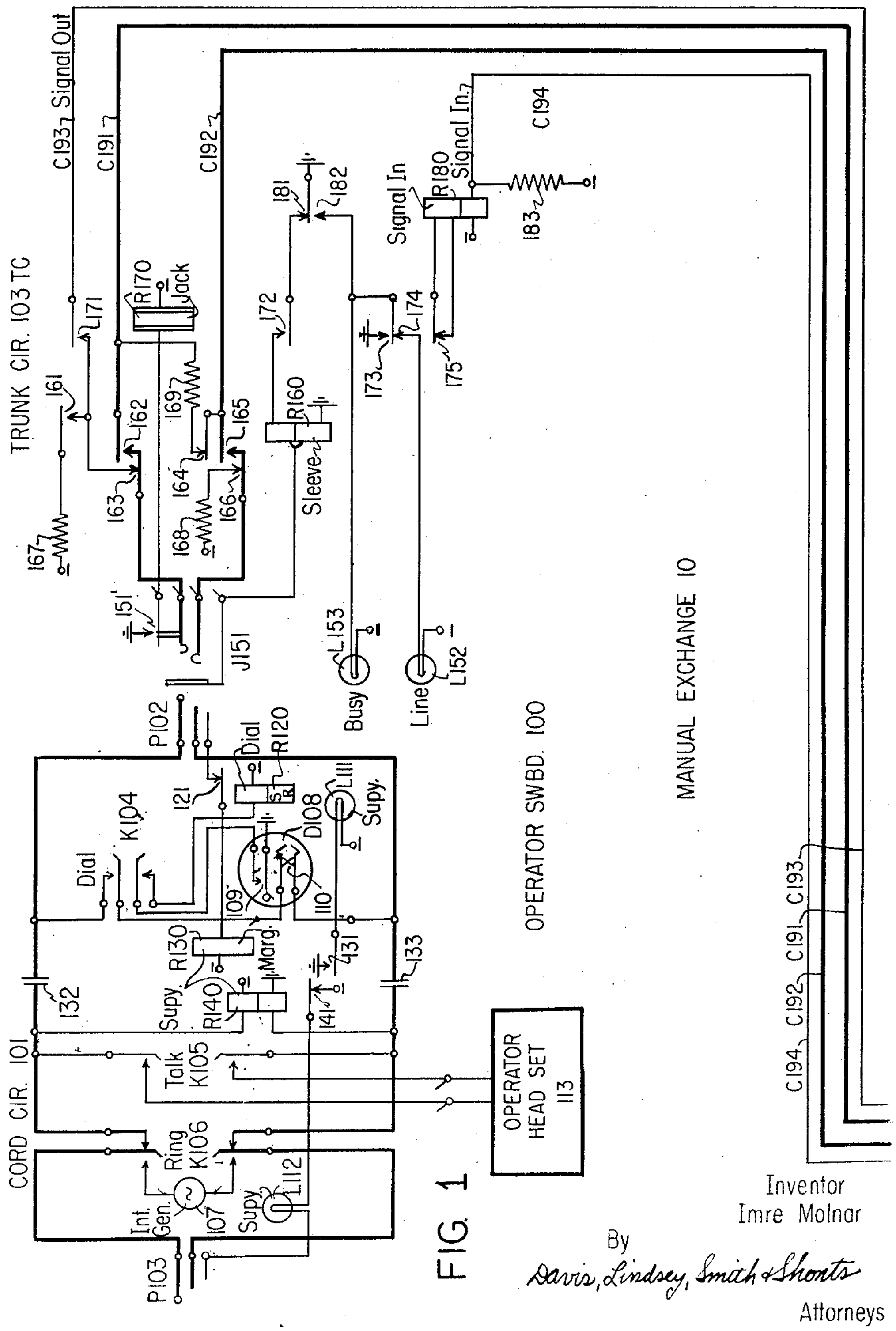

More particularly, Fig. 1 illustrates the details of one of the cord circuits disposed at the operator switchboard and the details of one of the trunk circuits, both disposed in the manual exchange 10 in the telephone system of Fig. 7; Fig. 2 illustrates the details of one of the trunk circuits disposed in the automatic exchange 20 in the telephone system illustrated in Fig. 7; Fig. 3 illustrates the general arrangement of the automatic switching apparatus arranged in the automatic exchange 20 in the telephone system of Fig. 7; and Figs. 4 and 5 respectively illustrate diagrammatically the carrier equipment disposed in the manual exchange 10 and in the automatic exchange 20 and interconnected by a line extending therebetween in the telephone system illustrated in Fig. 7.

Referring now more particularly to Fig. 7, the telephone system there illustrated comprises a manual exchange 10 serving a group of subscriber substations, not shown, and an automatic exchange 20 serving a plurality of groups of subscriber substations, one of the groups including the subscriber substation T. The manual exchange 10 and the automatic exchange 20 are interconnected by a line 400 extending therebetween. The west end of the line 400 terminates in voice frequency equipment 412W disposed in or beyond the manual exchange 10; and the east end of the line 400 terminates in voice frequency equipment 512E disposed in or beyond the automatic exchange 20. The manual exchange 10 also comprises an operator switchboard 100, while the automatic exchange 20 comprises automatic switching apparatus 300.

The manual exchange 10 and the automatic exchange 20 are interconnected via the line 400 by a three channel carrier system comprising common channel carrier equipment and individual channel carrier equipment disposed in each of the exchanges mentioned. More particularly, the common channel carrier equipment disposed in the manual exchange 10 comprises a high pass line filter 413 directly connected to the west portion of the line 400, a receiving direction filter 414 and a transmitting direction filter 415 both connected to the high pass line filter 413, a receiving line amplifier 416 connected to the receiving direction filter 414, and a transmitting line amplifier 417 connected to the transmitting direction filter 415. Also, a low pass line filter 411 is connected between the line 400 and the voice frequency equipment 412W. Similarly, the common channel carrier equipment disposed in the automatic exchange 20 comprises a high pass line filter 513 directly connected to the east portion of the line 400, a receiving direction filter 514 and a transmitting direction filter 515 both connected to the high pass line filter 513, a receiving line amplifier 516 connected to the receiving direction filter 514, and a transmitting line amplifier 517 connected to the transmitting direction filter 515. Also, a low pass line filter 511 is connected between the line 400 and the voice frequency equipment 512E.

The individual channel carrier equipment disposed in the manual exchange 10 comprises three individual units of carrier equipment 401W, 402W and 403W commonly connected to the receiving line amplifier 416 and to the transmitting line amplifier 417, and three respectively associated trunk circuits 101TC, 102TC and 103TC interposed between the operator switchboard 100 and the individual channel carrier equipment mentioned. Similarly, the individual channel carrier equipment disposed in the automatic exchange 20 comprises three individual units of carrier equipment 501E, 502E and 503E commonly connected to the receiving line amplifier 516 and to the transmitting line amplifier 517, and three respectively associated trunk circuits 201TC, 202TC and 203TC interposed between the automatic switching apparatus 300 and the individual channel carrier equipment mentioned. Each of the trunk circuits 201TC, etc. is provided with an outgoing trunk and an incoming trunk individual thereto; the trunk circuit 203TC being provided with the outgoing trunk 310 and the incoming trunk 320 individual thereto.

It will be understood that in the carrier system the individual channel carrier equipment 401W, 402W and 403W in the manual exchange 10 are respectively paired with the individual channel carrier equipment 501E, 502E and 503E disposed in the automatic exchange 20; which three pairs of individual channel carrier equipment comprises the respective first, second and third channels mentioned.

Preferably, the carrier system comprises a type 32 Lenkurt unit, wherein the individual channel carrier equipment 503E transmits a carrier frequency of 9.35 kc. for signaling purposes, transmits the lower side band of the carrier frequency 9.35 kc. (6.5 to 9.1 kc.) for communication purposes, receives a carrier frequency of 28.45 kc. for signaling purposes, and receives the lower side band of the carrier frequency 28.45 kc. (25.6 to 28.2 kc.) for communication purposes; the individual channel carrier equipment 502E transmits a carrier frequency of 12.55 kc. for signaling purposes, transmits the lower side band of the carrier frequency 12.55 kc. (9.7 to 12.3 kc.) for communication purposes, receives a carrier frequency of 20.85 kc. for signaling purposes, and receives the lower side band of the carrier frequency 20.85 kc. (18.0 to 20.6 kc.) for communication purposes; the individual channel carrier equipment 501E transmits a carrier frequency of 15.95 kc. for signaling purposes, transmits the lower side band of the carrier frequency 15.95 kc. (13.1 to 15.7 kc.) for communication purposes, receives a carrier frequency of 24.55 kc. for signaling purposes, and receives the lower side band of the carrier frequency 24.55 kc. (21.7 to 24.3 kc.) for communication purposes; the individual channel carrier equipment 402W transmits a carrier frequency of 20.85 kc. for signaling purposes, transmits the lower side band of the carrier frequency 20.85 kc. (18.0 to 20.6 kc.) for communication purposes, receives a carrier frequency of 12.55 kc. for signaling purposes, and receives the lower side band of the carrier frequency 12.55 kc. (9.7 to 12.3 kc.) for communication purposes; the individual channel carrier equipment 401W transmits a carrier frequency of 24.55 kc. for signaling purposes, transmits the lower side band of the carrier frequency 24.55 kc. (21.7 to 24.3 kc.) for communication purposes, receives a carrier frequency of 15.95 kc. for signaling purposes, and receives the lower side band of the carrier frequency 15.95 kc. (13.1 to 15.7 kc.) for communication purposes; and the individual channel carrier equipment 403W transmits a carrier frequency of 28.45 kc. for signaling purposes, transmits the lower side band of the carrier frequency 28.45 kc. (25.6 to 28.2 kc.) for communication purposes, receives a carrier frequency of 9.35 kc. for signaling purposes, and receives the lower side band of the carrier frequency 9.35 kc. (6.5 to 9.1 kc.) for communication purposes.

As shown in Fig. 1, the operator switchboard 100 comprises a number of cord circuits, including the cord circuit 101, and standard common equipment, including a headset 113, a dial D108 and an interrupter generator 107. Further, the cord circuit 101 comprises two plugs P102 and P103, a dial key K104 operative to connect the dial D108 thereto, a talk key K105 operative to connect the headset 113 thereto, and a ring key K106 operative to connect the interrupter generator 107 thereto. Also, the cord circuit 101 comprises a supervisory lamp L111 associated with the plug P102, a supervisory lamp L112 associated with the plug P103, a supervisory relay R130 associated with the supervisory lamp L111, a supervisory relay R140 associated with the supervisory lamp L112, and a dial relay R120 associated with the dial key K104 and with the dial D108.

Figure 4:
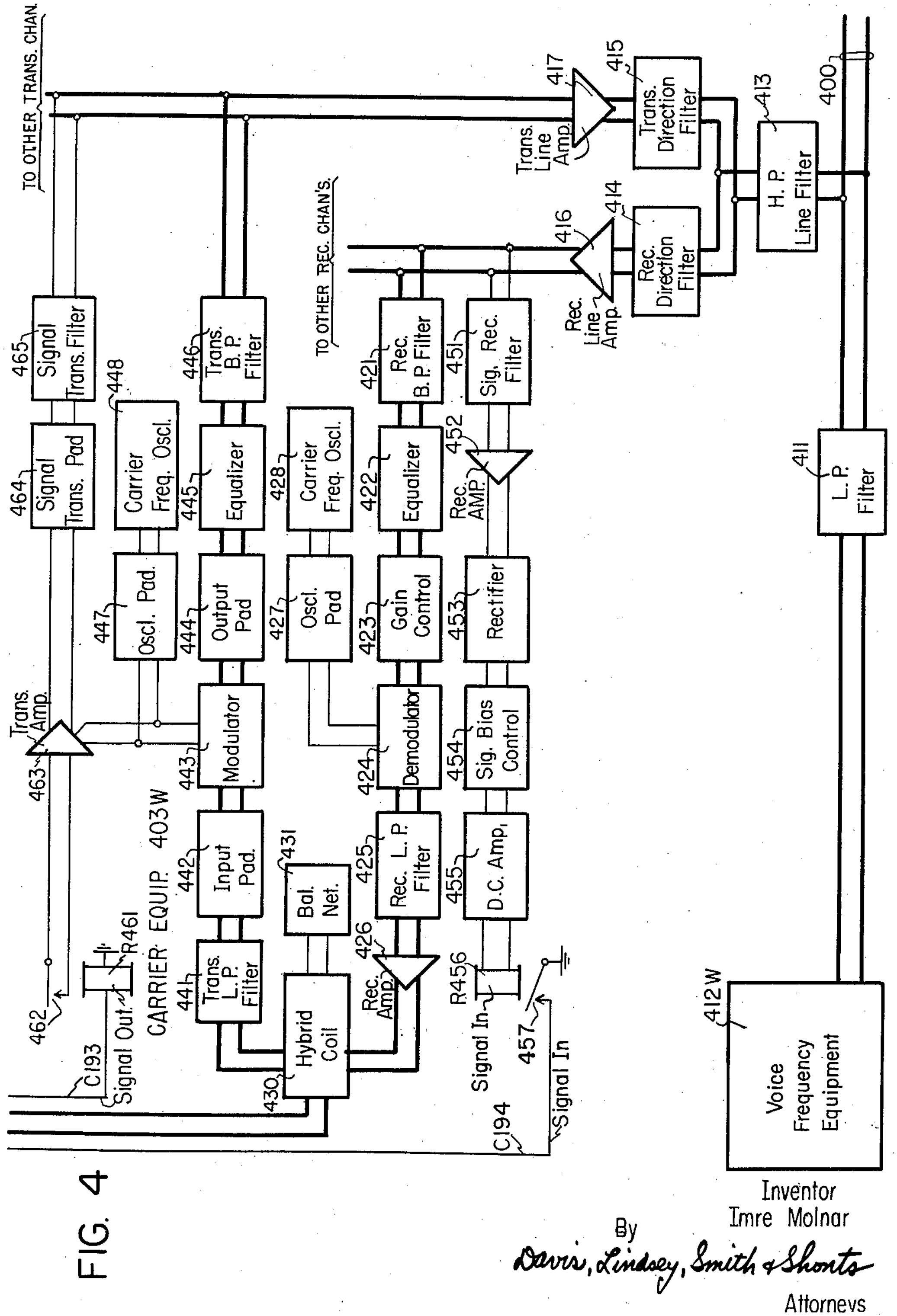

The trunk circuits 101TC, 102TC and 103TC are identical; the trunk circuit 103TC shown in Fig. 1 being connected to the carrier equipment 403W shown in Fig. 4, as previously noted. The trunk circuit 103TC terminates in a jack J151 at the operator switchboard 100 and comprises a line lamp L152, a busy lamp L153 and a relay group, including a sleeve relay R160, a jack relay R170 and a signal-in relay R180.

Figure 5:
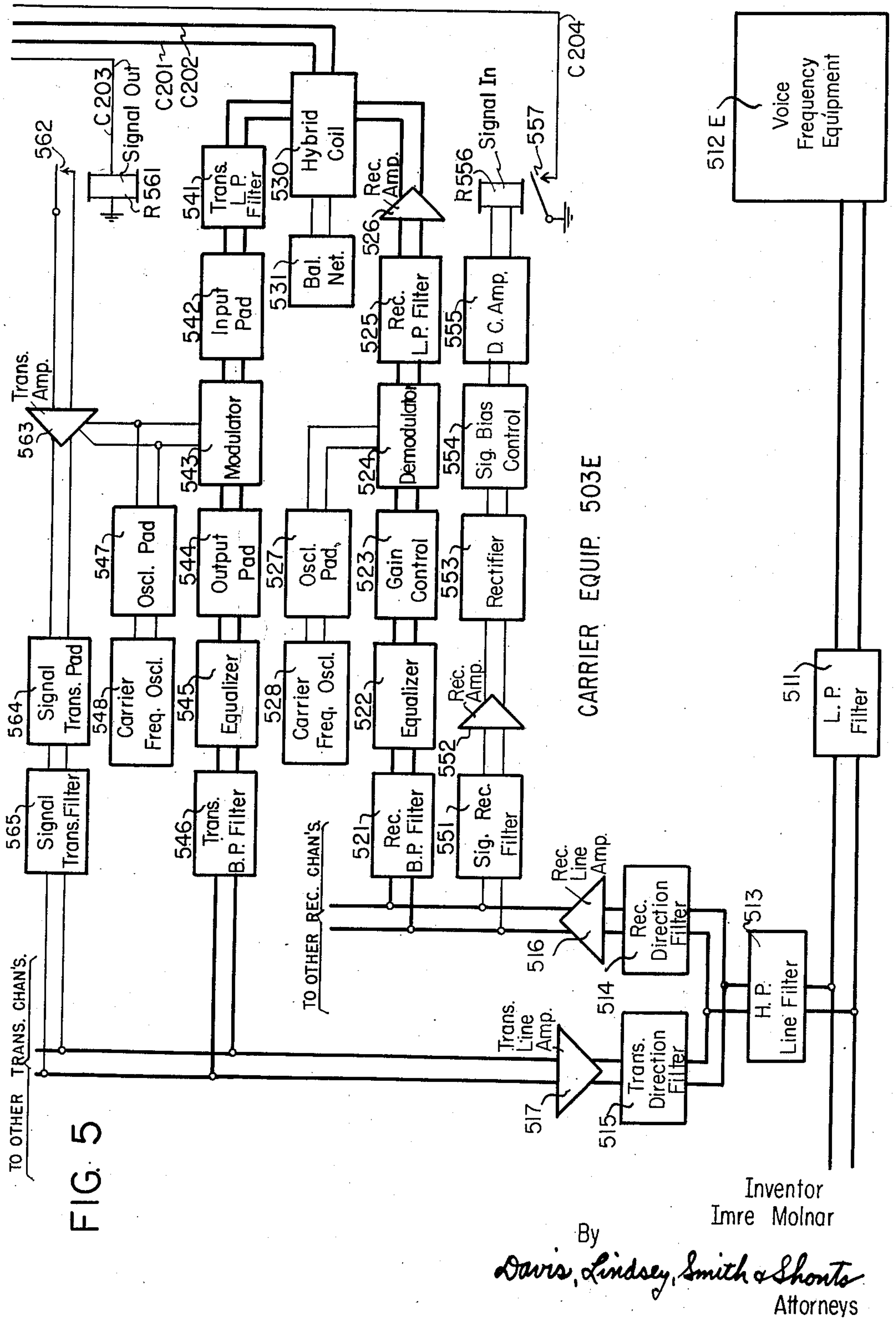

The trunk circuits 201TC, 202TC and 203TC are identical; the trunk circuit 203TC shown in Fig. 2 being connected to the carrier equipment 503E shown in Fig. 5, as previously noted. The trunk circuit 203TC terminates in an outgoing trunk 310 accessible to the automatic switching apparatus 300 and an incoming trunk 320 having access to the automatic switch apparatus 300, as previously noted; and comprises a relay group, including a hold relay R210, a hold relay R220, a timer relay R230, a dial relay R240, a timer relay R250, a tone relay R260, an answer relay R265, a switch relay R270, a signal-in relay R280, a supervisory relay R285, a line relay R290 and a reverse battery relay R295.

As shown in Fig. 3, the subscriber substation T has a subscriber line 330 extending thereto, with which a line circuit 335 is individually associated. The automatic switching apparatus 300 comprises a plurality of groups of finder-selector links, each provided with an associated distributor, and corresponding to the groups of subscriber substations. One of the groups of finder-selector links includes the finder 342 and the selector 341 and is provided with the individually associated distributor 340; which group of finder-selector links is associated with the group of subscriber substations, including the subscriber substation T. Also, the automatic switching apparatus 300 comprises a plurality of groups of connectors respectively associated with the groups of subscriber substations. One of the groups of connectors includes the connector 370 and is associated with the group of subscriber substations, including the subscriber substation T. Also, the automatic switching apparatus 300 comprises a group of outgoing selectors, including the outgoing selector 350, and three incoming selectors, including the incoming selector 360. More particularly, the finder 342 of the finder-selector link illustrated has access to the subscriber line 330 extending to the subscriber substation T; while the selector 341 of the finder-selector link illustrated has access to the connector 370 by way of the associated trunk 371, and has access to the outgoing selector 350 by way of the associated trunk 351. Also, the outgoing selector 350 has access to the outgoing trunk 310 extending into the trunk circuit 203TC; while the incoming trunk 320 extending from the trunk circuit 203TC is terminated in the incoming selector 360. Finally, the incoming selector 360 has access to the connector 370 by way of the associated trunk 371.

Preferably, the finders 342, etc., the selectors 341, etc., the outgoing selectors 350, etc., the incoming selectors 360, etc. and the connectors 370, etc. are of the well-known Strowger types. Also, the finder 342 comprises a plurality of sets of post normal switch springs, one of which is indicated at S344, which sets of switch springs are actuated selectively in response to operation of the finder 342 different numbers of steps in the vertical direction in the selection of the corresponding ten line groups; and which sets of switch springs are connected to individually associated class tone conductors. Specifically, the set of switch springs S344 is actuated into closed circuit relation in order to connect the associated class tone conductor C346 to the associated condenser 345 when the finder 342 is operated a predetermined number of steps in the vertical direction to select the ten line group of subscriber lines, including the subscriber line 330, extending to the subscriber substation T illustrated. Thus it will be understood that the subscriber substation T is in a given ten line group rendered a particular class of service, as indicated by the signal present on the class tone conductor C346.

Similarly, the selector 341 comprises a set of post normal switch springs S343 which is operated into closed circuit relation when the selector 341 is operated to a predetermined level to select the group of trunks, including the trunk 351, and indicative of a trunk call from the automatic exchange 20 to the manual exchange 10.

Referring to Fig. 4, the low pass filter 411 is arranged to pass audio frequency signals on the line 400 to the voice frequency equipment 412W but to block all of the high frequency carrier signals in order to prevent interference with the normal operation of the voice frequency equipment 412W. The high pass line filter 413 is arranged to pass high frequency carrier signals in the overall range 6.5 to 28.45 kc. and to block the passage of audio frequency signals in order to prevent interference with the carrier system. The receiving direction filter 414 is arranged to pass carrier frequency signals toward the lower end of the overall carrier frequency range and particularly the carrier frequencies between 6.5 and 15.95 kc., and to block carrier frequency signals toward the upper end of the overall carrier frequency range and particularly the carrier frequency between 18.0 and 28.45 kc. On the other hand, the transmitting direction filter 415 is arranged to pass carrier frequency signals toward the upper end of the overall carrier frequency range and particularly the carrier frequencies between 18.0 and 28.45 kc., and to block carrier frequency signals toward the lower end of the overall carrier frequency range and particularly the carrier frequencies between 6.5 and 15.95 kc.

The carrier equipment 403W comprises, as shown in Fig. 4, a receiving communication channel, including a receiving band pass filter 421 connected to the receiving line amplifier 416 and arranged to pass the lower side band of the carrier frequency 9.35 kc. (6.5 to 9.1 kc.), an attenuation equalizer 422 connected to the receiving band pass filter 421, a gain control 423 connected to the attenuation equalizer 422, and a demodulator 424 connected to the gain control 423. Further, a carrier frequency oscillator 428 having an output frequency of 9.35 kc. is connected by an oscillator pad 427 to the demodulator 424; and the demodulator 424 is connected to a receiving low pass filter 425 arranged to pass audio frequency signals; which, in turn, is connected by a receiving amplifier 426 to a hybrid coil 430 provided with a balancing network 431. Further, the hybrid coil 430 is connected by way of the conductors C191 and C192 to the trunk circuit 103TC, as previously noted.

Also, the carrier frequency equipment 403W comprises a receiving signal channel, including a signal receiving filter 451 connected to the receiving line amplifier 416 and arranged to pass the carrier frequency 9.35 kc.; which, in turn, is connected by way of a receiving amplifier 452 to a rectifier 453. The output of the rectifier 453 is connected by way of a signal bias control 454 to a D. C. amplifier 455, the output of which is connected to a signal-in relay R456. The D. C. amplifier 455 normally supplies sufficient current to the winding of the signal-in relay R456 to maintain the latter relay in its operated position, whereby the signal-in relay R456 maintains interrupted, at its contacts 457, an obvious path for applying ground potential to the signal-in conductor C194 extending to the trunk circuit 103TC. However, when the receiving signal channel receives the carrier frequency of 9.35 kc., the rectifier 453 is controlled by the receiving amplifier 452 to produce a current that is supplied to the signal bias control 454, whereby the bias applied to the D. C. amplifier 455 is increased in order to cause the output current thereof to be reduced sufficiently to bring about the restoration of the signal-in relay R456. Upon restoring, the signal-in relay R456 completes, at the contacts 457, the previously mentioned path for applying ground potential to the signal-in conductor C194 extending to the trunk circuit 103TC. Accordingly, as signal pulses of 9.35 kc. carrier frequency are received by the receiving channel, the signal-in relay R456 follows, repeating, at the contacts 457, corresponding ground impulses over the signal-in conductor C194 extending to the trunk circuit 103TC.

Further, the carrier equipment 403W comprises a transmitting communication channel including a transmission low pass filter 441 connected to the hybrid coil 430 and arranged to pass audio frequencies; which, in turn, is connected by way of an input pad 442 to a modulator 443. A carrier frequency oscillator 448 having an output frequency of 28.45 kc. is connected by an oscillator pad 447 to the modulator 443; and the modulator 443 is connected by an output pad 444 to an attenuation equalizer 445. The attenuation equalizer 445 is connected to a transmission band pass filter 446, arranged to pass the lower side band of the carrier frequency 28.45 kc. (25.6 to 28.2 kc.) and to block the upper side band of the carrier frequency 28.45 kc.; which, in turn, is connected to the transmission line amplifier 417.

Finally, the carrier equipment 403W comprises a transmission signal channel including a normally restored signal-out relay R461 connected to the signal-out conductor C193 extending to the trunk circuit 103TC; which signal-out relay R461 is adapted to be operated in order to close, at its contacts 462, the plate circuit for a transmission amplifier 463; which, in turn, is connected to the carrier frequency oscillator 448 by way of the oscillator pad 447. Also, the transmission amplifier 463 is connected by way of a signal transmission pad 464 to a signal transmission filter 465 arranged to transmit the carrier frequency 28.45 kc. Finally, the signal transmission filter 465 is connected to the transmission line amplifier 417. Accordingly, as the signal-out relay R461 is operated and then restored it completes and then interrupts, at the contacts 462, the plate circuit extending to the transmission amplifier 463, whereby corresponding pulses of 28.45 kc. carrier are transmitted from the transmission amplifier 463 via the signal transmission pad 464, and thence through the signal transmission filter 465 into the transmission line amplifier 417.

Referring to Fig. 5, the low pass filter 511 is arranged to pass audio frequency signals on the line 400 to the voice frequency equipment 512W but to block all of the high frequency carrier signals in order to prevent interference with the normal operation of the voice frequency equipment 512E. The high pass line filter 513 is arranged to pass high frequency carrier signals in the overall range 6.5 to 28.45 kc. and to block the passage of audio frequency signals in order to prevent interference with the carrier system. The receiving direction filter 514 is arranged to pass carrier frequency signals toward the upper end of the overall carrier frequency range and particularly the carrier frequencies between 18.0 and 28.5 kc., and to block carrier frequency signals toward the lower end of the overall carrier frequency range and particularly the carrier frequencies between 6.5 and 15.95 kc. On the other hand, the transmitting direction filter 515 is arranged to pass carrier frequency signals toward the lower end of the overall carrier frequency range and particularly the carrier frequencies between 6.5 and 15.95 kc., and to block carrier frequency signals toward the upper end of the overall carrier frequency range and particularly the carrier frequencies between 18.0 and 28.5 kc.

The carrier equipment 503E comprises, shown in Fig. 5, a receiving communication channel, including a receiving band pass filter 521 connected to the receiving line amplifier 516 and arranged to pass the lower side band of the carrier frequency 28.45 kc. (25.6 to 28.2 kc.), an attenuation equalizer 522 connected to the receiving band pass filter 521, a gain control 523 connected to the attenuation equalizer 522, and a demodulator 524 connected to the gain control 523. Further, a carrier frequency oscillator 528 having an output frequency of 28.45 kc. is connected by an oscillator pad 527 to the demodulator 524; and the demodulator 524 is connected to a receiving low pass filter 525 arranged to pass audio frequency signals; which, in turn, is connected by a receiving amplifier 526 to a hybrid coil 530 provided with a balancing network 531. Further, the hybrid coil 530 is connected by way of the conductors C201 and C202 to the trunk circuit 203TC, as previously noted.

Also, the carrier frequency equipment 503E comprises a receiving signal channel, including a signal receiving filter 551 connected to the receiving line amplifier 516 and arranged to pass the carrier frequency 28.45 kc.; which, in turn, is connected by way of a receiving amplifier 552 to a rectifier 553. The output of the rectifier 553 is connected by way of a signal bias control 554 to a D. C. amplifier 555, the output of which is connected to a signal-in relay R556. The D. C. amplifier 555 normally supplies sufficient current to the winding of the signal-in relay R556 to maintain the latter relay in its operated position, whereby the signal-in relay R556 maintains interrupted, at its contacts 557, an obvious path for applying ground potential to the signal-in conductor C204 extending to the trunk circuit 203TC. However, when the receiving signal channel receives the carrier frequency of 28.45 kc., the rectifier 553 is controlled by the receiving amplifier 552 to produce a current that is supplied to the signal bias control 554, whereby the bias applied to the D. C. amplifier 555 is increased in order to cause the output current thereof to be reduced sufficiently to bring about the restoration of the signal-in relay R556. Upon restoring, the signal-in relay R556 completes, at the contacts 557, the previously mentioned path for applying ground potential to the signal-in conductor C204 extending to the trunk circuit 203TC. Accordingly, as signal pulses of 28.45 kc. carrier frequency are received by the receiving channel, the signal-in relay R556 follows, repeating, at the contacts 557, corresponding ground impulses over the signal-in conductor C204 extending to the trunk circuit 203TC.

Further, the carrier equipment 403W comprises a transmitting communication channel including a transmission low pass filter 541 connected to the hybrid coil 530 and arranged to pass audio frequencies; which, in turn, is connected by way of an input pad 542 to a modulator 543. A carrier frequency oscillator 548 having an output frequency of 9.35 kc. is connected by an oscillator pad 547 to the modulator 543; and the modulator 543 is connected by an output pad 544 to an attenuation equalizer 545. The attenuation equalizer 545 is connected to a transmission band pass filter 546, arranged to pass the lower side band of the carrier frequency 9.35 kc. (6.5 to 9.1 kc.) and to block the upper side band of the carrier frequency 9.35 kc.; which, in turn, is connected to the transmission line amplifier 517.

Finally, the carrier equipment 503E comprises a transmission signal channel including a normally restored signal-out relay R561 connected to the signal-out conductor C203 extending to the trunk circuit 203TC; which signal-out relay R561 is adapted to be operated in order to close, at its contacts 562, the plate circuit for a transmission amplifier 563; which, in turn, is connected to the carrier frequency oscillator 548 by way of the oscillator pad 547. Also, the transmission amplifier 563 is connected by way of a signal transmission pad 564 to a signal transmission filter 565 arranged to transmit the carrier frequency 9.35 kc. Finally, the signal transmission filter 565 is connected to the transmission line amplifier 517. Accordingly, as the signal-out relay R561 is operated and then restored it completes and then interrupts, at the contacts 562, the plate circuit extending to the transmission amplifier 563, whereby corresponding pulses of 9.35 kc. carrier are transmitted from the transmission amplifier 563 via the signal transmission pad 564, and thence through the signal transmission filter 565 into the transmission line amplifier 517.

A better understanding of the connection and arrangement of the apparatus incorporated in the telephone system illustrated in Fig. 7 and briefly described above will be facilitated from a consideration of the extension of connections involving the manual exchange 10 and the automatic exchange 20.

Considering now the extension of a connection between the manual exchange 10 and the automatic exchange 20, and assuming that a call has been extended from a calling subscriber substation, not shown, in the manual exchange 10 to the operator switchboard 100 therein and that the operator at the switchboard 100 has answered the call utilizing the cord circuit 101, at this time the plug P103 of the cord circuit 101 has been inserted into the jack terminating the subscriber line extending to the calling subscriber substation and the talk key K105 has been operated, in order to connect the operator headset 113 to the cord circuit 101. At this time the operator at the switchboard 100 learns that the subscriber at the calling subscriber substation in the manual exchange 10 desires to converse with a subscriber in the automatic exchange 20, such, for example, as the subscriber at the called subscriber substation T. The operator at the switchboard 100, observing the condition of the trunk circuits 101TC, 102TC and 103TC, as indicated by the corresponding busy lamps, selects an idle one of the trunk circuits mentioned and inserts the plug P102 of the cord circuit 101 into the corresponding terminating jack. Assuming that the trunk circuit 103TC is idle at this time, the operator at the switchboard 100 inserts the plug P102 of the cord circuit 101 into the corresponding jack J151 terminating the trunk circuit mentioned; the trunk circuit 103TC being indicated as idle at this time by the unlighted busy lamp L153 individual thereto.

When the plug P102 is inserted into the jack J151 the contacts 151' thereof are operated, completing an obvious circuit for operating the jack relay R170 in the trunk circuit 103TC. Also, a series circuit, including the contacts 121, is completed for energizing the supervisory relay R130 in the cord circuit 101 and the lower winding of the sleeve relay R160 in the trunk circuit 103TC, whereby the sleeve relay R160 operates. However, the supervisory relay R130 does not operate as it is of the marginal type. Upon operating, the jack relay R170 completes, at the contacts 173, an obvious circuit for illuminating the busy lamp L153, thereby to indicate the busy condition of the trunk circuit 103TC; and interrupts, at the contacts 175, an obvious path for short-circuiting the upper winding of the signal-in relay R180 in order to increase the speed of response of the latter relay. Also, the jack relay R170 completes, at the contacts 172, a circuit, including the contacts 181, for energizing the upper winding of the sleeve relay R160 in multiple with the lower winding thereof and in series with the winding of the supervisory relay R130, whereby the supervisory relay R130 operates. Upon operating, the supervisory relay R130 completes, at the contacts 131, an obvious circuit for illuminating the supervisory lamp L111 in the cord circuit 101. Finally, upon operating, the jack relay R170 completes, at the contacts 171, a circuit, including the contacts 163 and 166, for applying battery potential by way of the resistor 168 to the signal-out conductor C193, assuming that the dial key K104 in the cord circuit 101 is operated at this time; which application of resistance battery potential to the signal-out conductor C193 completes an obvious circuit for operating the signal-out relay R461 in the carrier equipment 403W. The above-mentioned circuit extends from battery by way of the resistor 168, the contacts 166, the ring of the jack J151, the ring of the plug P102, the impulse contacts 110 of the dial D108, and the upper contacts of the dial key K104 to the tip of the plug P102, and therefrom by way of the tip of the jack J151 and the contacts 163 and 171 to the signal-out conductor C193. Upon operating, the sleeve relay R160 completes, at the contacts 161, a multiple circuit, including the contacts 171, for applying battery potential by way of the resistor 167 to the signal-out conductor C193 and then interrupts, at the contacts 163 and 166, the above-traced original path for applying battery potential by way of the resistor 168 to the signal-out conductor C193. Also, the sleeve relay R160 interrupts, at the contacts 164, a normally completed termination circuit, including the resistor 169, between the line conductors C191 and C192 extending between the trunk circuit 103TC and the hybrid coil 430 in the carrier equipment 403W. Finally, the sleeve relay R160 completes, at the contacts 162 and 165, a connection between the line conductors C191 and C192 and the tip and ring of the jack J151 and, consequently, to the tip and ring of the plug P102, which at this time are operatively connected together by way of the upper contacts of the dial key K104 and the impulse contacts 110 of the dial D108.

The operator at the switchboard 100 then proceeds to dial the first digit of the directory number of the called subscriber substation T in the automatic exchange 20. When the dial D108 is thus operated the off-normal springs 109 thereof are first actuated into engagement, thereby to complete a circuit, including the lower contacts of the dial key K104, for operating the dial relay R120 in the cord circuit 101. Upon operating, the dial relay R120 interrupts, at the contacts 121, the previously traced series circuit for energizing the winding of the supervisory relay R130 in the cord circuit 101 and the upper and lower multiply connected windings of the sleeve relay R160 in the trunk circuit 103TC, whereby the relays mentioned restore. Upon restoring, the supervisory relay R130 interrupts, at the contacts 131, the previously mentioned circuit for illuminating the supervisory lamp L111 in the cord circuit 101; and, upon restoring, the sleeve relay R160 recompletes, at the contacts 163 and 166, the previously traced original path for applying battery potential by way of the resistor 168 to the signal-out conductor C193, which path includes the upper contacts of the dial key K104 and the impulse contacts 110 of the dial D108, both in the cord circuit 101, as previously noted. Further, the sleeve relay R160 interrupts, at the contacts 161, the previously traced alternative path for applying battery potential by way of the resistor 167 to the signal-out conductor C193; interrupts, at the contacts 162 and 165, the previously traced path, including the upper contacts of the dial key K104 and the impulse contacts 110 of the dial D108 in the cord circuit 101, across the line conductors C191 and C192; and recompletes, at the contacts 164, the previously mentioned termination circuit including the resistor 169 between the line conductors C191 and C192. At this time battery potential is applied by way of the resistor 168 to the signal-out conductor C193 over the above-traced path including the impulse contacts 110 of the dial D108 in the cord circuit 101. Accordingly, as the dial D108 is returned to its normal position the impulse contacts 110 thereof are operated one or more times, corresponding to the number of impulses in the digit dialed, effecting interruption and then recompletion a corresponding number of times of the above-traced path for applying battery potential by way of the resistor 168 to the signal-out conductor C193, whereby the signal-out relay R461 in the carrier equipment 403W follows the impulses of the present digit. At the conclusion of the first digit when the dial D108 in the cord circuit 101 is returned to its normal position, the impulse contacts 110 thereof are maintained in closed circuit position and the off-normal contacts 109 thereof are actuated into disengagement in order to interrupt the circuit for maintaining operated the dial relay R120 in the cord circuit 101. Shortly thereafter the dial relay R120 restores, as it is of the slow-to-release type, recompleting, at the contacts 121, the previously traced series circuit for energizing the winding of the supervisory relay R130 in the cord circuit 101 and the multiply connected upper and lower windings of the sleeve relay R160 in the trunk circuit 103TC, causing the relays mentioned to reoperate. Upon reoperating, the supervisory relay R130 again completes, at the contacts 131, the previously mentioned circuit for illuminating the supervisory lamp L111; and, upon reoperating, the sleeve relay R160 recompletes, at the contacts 161, the previously traced alternative path for applying battery potential by way of the resistor 167 to the signal-out conductor C193; and interrupts, at the contacts 163 and 166, the previously traced original path for applying battery potential by way of the resistor 168 to the signal-out conductor C193. In a similar manner the operator at the switchboard 100 dials the second and third digits of the directory number of the called subscriber substation T in the automatic exchange 20 and then, at the conclusion of the dialing of the third digit mentioned, she restores the dial key K104 to its normal position, thereby interrupting the previously traced bridge including the impulse contacts 110 of the dial D108 between the tip and the ring of the plug P102 of the cord circuit 101. At this time the tip and the ring of the plug P102 are operatively connected by way of the condensers 132 and 133 to the tip and the ring of the plug P103 and, consequently, by way of the contacts of the talk key K105 to the operator headset 113.

In view of the foregoing explanation of the manner in which the operator at the switchboard 100 seizes the trunk circuit 103TC utilizing the cord circuit 101, it will be understood that resistance battery potential is first steadily applied to the signal-out conductor C193; and then application of resistance battery potential to the signal-out conductor C193 is interrupted, at three different times, one or more times each corresponding to the impulses in the three digits mentioned; and then steady resistance battery potential is reapplied to the signal-out conductor C193. Accordingly, the signal-out relay R461 in the carrier equipment 403W operates steadily; then follows the impulses of the three spaced apart digits mentioned; and then operates steadily again. Each time the signal-out relay R461 operates and then restores it completes and then interrupts, at the contacts 462, the plate circuit of the transmission amplifier 463 connected by way of the oscillator pad 447 to the carrier frequency oscillator 448, producing a carrier frequency of 28.45 kc.; whereby the transmission amplifier 463 operates to project and then to interrupt the 28.45 kc. carrier frequency over the signal transmission pad 464 through the signal transmission filter 465 to the transmission line amplifier 417. The signal transmission pad 464 establishes the input of the transmission line amplifier 417 at the required level; and the signal transmission filter 465 insures that only the 28.45 kc. carrier frequency is included in the input of the transmission line amplifier 417.

Each time the transmission line amplifier 417 receives the 28.45 kc. carrier signal it amplifies the input carrier signal and passes a corresponding amplified carried signal through the transmission direction filter 415 and the high pass line filter 413 to the line 400. The transmission direction filter 415 passes the frequencies 18.0 to 20.85 kc. extending toward the upper end of the overall carrier frequency range; while the high pass line filter 413 passes the frequencies 6.5 to 28.45 kc. extending over the entire carrier frequency range. The low pass filter 411 blocks the passage of all carrier frequencies on the line 400 to the voice frequency equipment 412W; and the low pass filter 511 blocks the passage of all carrier frequencies on the line 400 to the voice frequency equipment 512E. The 28.45 kc. carrier frequency on the line 400 passes through the high pass line filter 513 and the receiving direction filter 514 to the receiving line amplifier 516. The high pass line filter 513 passes the frequencies 6.5 to 28.45 kc. extending over the entire carrier frequency range; while the receiving direction filter 514 passes the frequencies 18.0 to 20.85 kc. extending toward the upper end of the overall carrier frequency range. The 28.45 kc. carrier frequency supplied to the receiving line amplifier 516 is amplified and passes through the signal receiving filter 551 to the receiving amplifier 552. The signal receiving filter 551 passes the 28.45 kc. carrier frequency and the amplified signal from the receiving amplifier 552 is rectified by the rectifier 553 in order to produce a bias that is passed to the signal bias control 554; which, in turn, governs the D. C. amplifier 555 in order to cause the D. C. amplifier 555 to reduce the output current thereof supplied to the signal-in relay R556, whereby the latter relay restores. Each time the 28.45 kc. carrier signal is cut off to the input of the transmission line amplifier 417 the carrier signal is removed from the line 400, permitting the signal bias control 554 to re-establish the original bias provided to the D. C. amplifier 555, whereby the output of the D. C. amplifier 555 is increased in order to bring about reoperation of the signal-in relay R556. Accordingly, each time the signal-out relay R461 in the carrier equipment 403W operates, the signal-in relay R556 in the carrier equipment 503E restores. Accordingly, the signal-in relay R556 in the carrier equipment 503E restores steadily; then follows the impulses of the three spaced apart digits mentioned; and then restores steadily again.

Each time the signal-in relay R556 restores and then reoperates it completes and then interrupts, at the contacts 557, an obvious path for applying ground potential to the signal-in conductor C204 extending into the trunk circuit 203TC, in order to cause operation and then restoration of the signal-in relay R280 in the trunk circuit mentioned. Accordingly, the signal-in relay R280 operates steadily; then follows the impulses of the three spaced apart digits mentioned; and then operates steadily again. Upon first operating, the signal-in relay R280 completes, at the contacts 281, an obvious path for short-circuiting the resistor 227 and the series connected condenser 226, and completes, at the contacts 283, an obvious circuit for operating the hold relay R220. Upon operating, the hold relay R220 completes, at the contacts 224, a circuit, including the contacts 216, for energizing the lower winding of the switch relay R270, thereby to cause the latter relay to operate. Upon operating, the switch relay R270 interrupts, at the contacts 271 and 274, the normal connections between the line conductors C201 and C202 extending from the hybrid coil 530 in the carrier equipment 503E and the line conductors C311 and C312 of the outgoing trunk 310 extending to the trunk circuit 203TC and accessible to the outgoing selector 530. Also, the switch relay R270 completes, at the contacts 272, 273 and 275, a connection between the line conductors C321 and C322 of the incoming trunk 320 extending to the incoming selector 360 and the line conductors C202 and C201 extending to the hybrid coil 530 in the carrier equipment 503E. Also, the switch relay R270 completes, at the contacts 273, a path, including the contacts 281, for connecting the right-hand winding of the answer relay R260 across the line conductors C321 and C322 of the incoming trunk 320 extending to the incoming selector 360, thereby to effect the seizure of the incoming selector 360, whereby it is rendered responsive to the first digit transmitted over the line 400. Also, the switch relay R270 interrupts, at the contacts 277, a normally completed path, including the contacts 213, for applying battery potential by way of the impedance 228 to the control conductor C313 of the outgoing trunk 310; and completes, at the contacts 278, a substantially identical path, including the contacts 213, for applying ground potential to the control conductor C313 of the outgoing trunk 310. When battery potential is thus removed from the ground potential is thus applied to the control conductor C313 of the outgoing trunk 310, the marking of the outgoing trunk 310 as idle is removed and the marking of the outgoing trunk 310 as busy is brought about. Accordingly, the outgoing trunk 310, and consequently the trunk circuit 203TC, is marked as busy to the outgoing selectors 350, etc. at this time. When the incoming selector 360 is conditioned to be responsive to the first digit transmitted over the line 400 as above noted, ground potential therein is returned over the control conductor C323 of the incoming trunk 320, thereby to complete a circuit for energizing the left-hand winding of the answer relay R265 and a multiple holding circuit for energizing the upper winding of the switch relay R270. The answer relay R265 does not operate at this time, since it is of the shunt field type, and will not operate until the right-hand winding thereof is energized in the opposite direction over the loop circuit extending by way of the line conductors C321 and C322 of the incoming trunk 320 to the incoming selector 360. At this time the carrier equipment 503E has seized the trunk circuit 203TC and the latter trunk circuit has seized the incoming selector 360, rendering it responsive to the first digit transmitted over the line 400.

When the first digit is received over the line 400 the signal-in relay R556 in the carrier equipment 503E follows, repeating, at the contacts 557, to the signal-in relay R280 in the trunk circuit 203TC, whereby the latter relay follows. Each time the signal-in relay R280 restores and then reoperates it interrupts and then recompletes, at the contacts 283, the previously mentioned circuit for maintaining operated the hold relay R220, thereby to cause the latter relay to remain operated during impulsing since it is of the slow-to-release type. Also, each time the signal-in relay R280 restores and then reoperates it completes and then interrupts, at the contacts 282, a circuit, including the contacts 222, for operating the dial relay R240, thereby to cause the latter relay to operate and remain operated during impulsing as it is of the slow-to-release type. Upon operating, the dial relay R240 completes, at the contacts 241, a path, including the resistor 219, in multiple with the right-hand winding of the answer relay R265, across the line conductors C321 and C322 of the incoming trunk 320, thereby to improve impulsing to the incoming-selector 360. Finally, each time the signal-in relay R280 restores and reoperates it interrupts and then recompletes, at the contacts 281, the previously traced loop circuit extending by way of the line conductors C321 and C322 of the incoming trunk 320, whereby the impulses of the first digit are transmitted to the incoming selector 360 in order to cause corresponding operation thereof. More particularly, the incoming selector 360 operates in response to the first digit to select the corresponding group of connectors, including the connector 370, and then operates automatically to select an idle connector in the previously selected group. For example, the incoming selector 360 may operate to seize the trunk 371 extending to the connector 370, whereby the connector 370 is conditioned to be responsive to the second and third digits transmitted over the line 400. At the conclusion of the first digit transmitted over the line 400 the signal-in relay R280 is retained in its operated position, thereby to retain completed the previously mentioned circuit for maintaining operated the hold relay R220 and to retain completed the previously traced loop circuit extending by way of the line conductors C321 and C322 of the incoming trunk 320 to the incoming selector 360. Finally, the operated signal-in relay R280 maintains interrupted, at the contacts 282, the previously traced circuit for maintaining operated the dial relay R240, whereby the latter relay restores shortly thereafter as it is of the slow-to-release type. Upon restoring, the dial relay R240 interrupts, at the contacts 241, the previously mentioned path, including the resistor 219, for short-circuiting the right-hand winding of the answer relay R265.

The second and third digits transmitted over the line 400 are received by the carrier equipment 503E and repeated to the trunk circuit 203TC in an identical manner, whereby the second and third digits mentioned are repeated by the trunk circuit 203TC over the incoming trunk 320, the incoming selector 360 and the trunk 371 to the connector 370, in order to cause corresponding operation thereof to select the subscriber line 330 extending to the called subscriber substation T in the automatic exchange 20, whereby the idle or busy condition thereof is tested in the connector 370. First assuming that the subscriber substation T is idle at this time, battery potential appears upon the control conductor C334 of the subscriber line 330 causing the connector 370 to operate in order to seize the subscriber line 330, whereby ground potential in the connector 370 is applied to the control conductor C334 of the subscriber line 330 extending to the associated line circuit 335, thereby marking the subscriber substation T as busy to the other connectors in the group, including the connector 370, having access thereto. Also, the connector 370 operates to project ringing current over the line conductors C331 and C332 of the subscriber line 330 in order to operate the ringer at the called subscriber substation T and to return ring-back tone current over the line conductors of the trunk 371 and, consequently, over the incoming selector 360, the line conductors C321 and C322 of the incoming trunk 320, and the line conductors C202 and C201 to the hybrid coil 530 in the carrier equipment 503E. The ring-back tone current is passed from the hybrid coil 530 through the transmission low pass filter 541 and the input pad 542 to the modulator 543. The transmission low pass filter 541 passes the audio frequency of the ring-back tone signal; and the input pad 542 establishes the required intensity of input of the ring-back tone signal into the modulator 543. The modulator 543 is supplied with the required intensity of 9.35 kc. carrier by the oscillator pad 547 from the carrier frequency oscillator 548 and, being of the balanced type, is now unbalanced whereby modulated 9.35 kc. carrier is passed therefrom through the output pad 544 and the attenuation equalizer 545 to the transmitting band pass filter 546. The output pad 544 controls the intensity of the modulated 9.35 kc. carrier that is supplied to the transmission line amplifier 517; while the attenuation equalizer 545 compensates for the disproportionate attenuation of high frequency components of the modulated 9.35 kc. carrier. Finally, the transmission band pass filter 546 passes the lower side band of the 9.35 kc. carrier, blocking the upper side band thereof.

The transmission line amplifier 517 amplifies the lower side band of the 9.35 kc. carrier and passes it through the transmission direction filter 515 and thence through the high pass line filter 513 to the line 400. The transmission direction filter 515 passes the carrier frequencies toward the lower end of the overall carrier frequency range, particularly the frequencies 6.5 to 15.95 kc.; while the high pass line filter 513 passes carrier frequencies over the entire carrier frequency range from 6.5 to 28.45 kc. Also, the lower pass filter 511 blocks the passage of all carrier frequencies on the line 400 into the voice frequency equipment 512E; and the low pass filter 411 blocks the passage of all carrier frequencies on the line 400 into the voice frequency equipment 412W. The lower side band of the 6.5 kc. carrier passes from the line 400 through the high pass line filter 413 and the receiving direction filter 414 to the receiving line amplifier 416. The high pass line filter 413 passes carrier frequenies over the entire carrier frequency range from 6.5 to 28.45 kc.; while the receiving direction filter 414 passes carrier frequencies toward the lower end of the overall carrier frequency range, particularly the frequencies from 6.5 to 15.95 kc. The receiving line amplifier 416 amplifies the lower side band of the 9.35 kc. carrier and passes it through the receiving band pass filter 421, the attenuation equalizer 422 and the gain control 423 to the demodulator 424. The receiving band pass filter 421 passes carrier frequencies from 6.5 to 9.1 kc.; and the attenuation equalizer 422 compensates for unequal attenuation of high frequency carrier signals on the line 400; while the gain control 423 establishes the intensity of the lower side band of the 9.35 kc. carrier signal supplied to the demodulator 424. The demodulator 424 is supplied with 9.35 kc. carrier frequency from the carrier frequency oscillator 428 by way of the oscillator pad 427, the oscillator pad 427 establishing the intensity of the 9.35 kc. carrier supplied to the demodulator 424. The demodulator 424 is of the balanced type, whereby the envelope of the lower side band of the 9.35 kc. carrier, determined by the ring-back tone signal, is produced and passed through the receiving low pass filter 425 to the receiving amplifier 426. The receiving low pass filter 425 passes audio frequency, the ring-black tone signal, and this signal is amplified by the receiving amplifier 426 and supplied to the hybrid coil 430. Finally, the ring-back tone signal is returned by the hybrid coil 430 over the line conductors C191 and S192 and, consequently, over the previously traced path to the operator headset 113 at the switchboard 100, in order to indicate to the operator thereat that the called subscriber substation T in the automatic exchange 20 is being rung.

When the subscriber at the called subscriber substation T in the automatic exchange 20 answers the call, the connector 370 switches through to interrupt the projection of ringing current over the subscriber line 330 extending to the called subscriber substation T and the return of ring-back tone current over the trunk 371 and the previously traced connection to the operator headset 113 at the switchboard 100 in the manual exchange 10. Also, the connector 370 operates to bring about the reversal of polarity over the line conductors of the trunk 371 and, consequently, over the incoming selector 360 and the line conductors C321 and C322 of the incoming trunk 320, whereby the right-hand winding of the answer relay R265 in the trunk circuit 203TC is poled to operate. Upon operating, the answer relay R265 interrupts, at the contacts 266, a normally completed termination circuit, including the resistor 225, the contacts 291 and 252, and the condenser 218 extending between the line conductors C202 and C201 interconnecting the trunk circuit 203TC and the hybrid coil 530 in the carrier equipment 503E, in order to prepare the connection for conversation between the operator switchboard 100 in the manual exchange 10 and the called subscriber substation T in the automatic exchange 20. Also, the answer relay R265 completes, at the contacts 267, an obvious circuit for energizing the lower winding of the supervisory relay R285, thereby to cause the latter relay ot operate and complete, at the contacts 287, an obvious path fcr applying battery potential by way of the resistor 229 to the signal-out conductor C203 extending to the carrier equipment 503E. This application of resistance battery potential to the signal-out conductor C203 completes an obvious circuit for operating the signal-out relay R561; whereupon the latter relay, upon operating, completes, at the contacts 562, the plate circuit for the transmission amplifier 563 which is supplied with 9.35 kc. carrier from the carrier frequency oscillator 548 through the oscillator pad 547. Accordingly, the transmission amplifier 563 supplies 9.35 kc. carrier by way of the signal transmission pad 564 and the signal transmission filter 565 to the transmission line amplifier 517. The oscillator pad 547 establishes the intensity of the 9.35 kc. carrier input to the transmission amplifier 563; and the signal transmission pad 564 establishes the intensity of the 9.35 kc. carrier supplied to the transmission line amplifier 517; while the signal transmission filter 565 insures that only the 9.35 kc. carrier is included in the input of the transmission line amplifier 517.

When the transmission line amplifier 517 receives the 9.35 kc. carrier signal it amplifies the input carrier signal and passes a corresponding amplified carrier signal through the transmission direction filter 515 and the high pass line filter 513 to the line 400. The 9.35 kc. carrier on the line 400 passes through the high pass filter 413 and the receiving direction filter 414 to the receiving line amplifier 416. The 9.35 kc. carrier supplied to the receiving line amplifier 416 is amplified and passes through the signal receiving filter 451 to the receiving amplifier 452. The signal receiving filter 451 passes the 9.35 kc. carrier and the amplified signal from the receiving amplifier 452 is rectified by the rectifier 453, in order to produce a bias that is passed to the signal bias control 454; which, in turn, governs the D. C. amplifier 455 in order to cause the D. C. amplifier 455 to reduce the output current thereof supplied to the signal-in relay R456, whereby the latter relay restores. Upon restoring, the signal-in relay R456 completes, at the contacts 457, an obvious path for applying ground potential to the signal-in conductor C194 extending to the trunk circuit 103TC, thereby to complete an obvious circuit for energizing the lower winding of the signal-in relay R180 therein, whereupon the latter relay operates. Upon operating, the signal-in relay R180 completes, at the contacts 182, an obvious multiple circuit for illuminating the busy lamp L153; and interrupts, at the contacts 181, the previously traced circuit for energizing the upper winding of the sleeve relay R160 in multiple with the lower winding thereof and in series with the winding of the supervisory relay R130 in the cord circuit 101, whereby the sleeve relay R160 is retained in its operated position and the supervisory relay R130 restores as it is of the marginal type. Upon restoring, the supervisory relay R130 interrupts, at the contacts 131, the previously mentioned circuit for illuminating the supervisory lamp L111 in the cord circuit 101, thereby to render to the operator at the switchboard 100 answer supervision. At this time the operator at the switchboard 100 may converse with the subscriber at the called subscriber substation T in the automatic exchange 20 and with the subscriber at the calling subscriber substation in the manual exchange 10, since a three-way communication connection has now been established. Then the operator may restore the talk key K105 of the cord circuit 101, disconnecting the operator headset 113 from the cord circuit 101, whereby a connection is then completed between the calling subscriber substation in the manual exchange 10 and the called subscriber substation T in the automatic exchange 20. At this time transmitter battery is supplied, via the upper and lower windings of the supervisory relay R140, the back contacts of the ring key K106 and the tip and the ring of the plug P103, to the calling subscriber substation, whereby the supervisory relay R140 occupies its operated position maintaining interrupted, at the contacts 141, a circuit for illuminating the supervisory lamp L112 in the cord circuit 101. Accordingly, the extinguished supervisory lamp L112 and the extinguished supervisory lamp L111 respectively indicate that the calling subscriber substation in the manual exchange 10 and the called subscriber substation T in the automatic exchange 20 are included in the established connection.

At this time audio frequency signals received from the calling subscriber substation in the manual exchange 10 pass through the condensers 132 and 133 in the cord circuit 101 via the plug P102 and the jack J151 into the trunk circuit 103TC, and thence over the line conductors C191 and C192 to the hybrid coil 430 in the carrier equipment 403W. The audio frequency signals then pass through the transmission low pass filter 441 via the input pad 442 to the modulator 443. The transmission low pass filter 441 insures the passage of only audio frequency signals; while the input pad 442 determines the intensity of the audio frequency signals impressed upon the modulator 443. As previously noted, the modulator 443 is connected to the 28.45 kc. carrier oscillator 448 by the oscillator pad 447 which maintains the desired intensity of the 28.45 kc. carrier impressed upon the modulator 443. The modulator 443 is of the balanced type, whereby modulated 28.45 kc. carrier is passed through th output pad 444 and the attenuation equalizer 445 to the transmission band pass filter 446. The output pad 444 establishes the intensity of the modulated 28.45 kc. carrier supplied to the transmission band pass filter 446; while the attenuation equalizer 445 compensates for the unequal attenuation of the high frequency carrier signals on the line 400. The transmission band pass filter 446 transmits the lower side band of the 28.45 kc. carrier (25.6 to 28.2 kc.), blocking the upper side band thereof and supplying the transmission line amplifier 417. The transmission line ampifier 417 amplifies the lower side band of the 28.45 kc. carrier and passes it through the transmission direction filter 415 and the high pass line filter 416 to the line 400. The lower side band of the 28.45 kc. carrier on the line 400 passes through the high pass line filter 513 and the receiving direction filter 514 to the receiving line amplifier 516. The receiving line amplifier 516 amplifies the lower side band of the 28.45 kc. carrier and passes it through the receiving band pass filter 521, the attenuation equalizer 522 and the gain control 523 to the demodulator 524. The receiving band pass filter 521 passes the lower side band of the 28.45 kc. carrier (25.6 to 28.2 kc.); and the attenuation equalizer 522 compensates for the unequal attenuation of the high frequency carrier signals on the line 400; while the gain control 523 establishes the desired intensity of the lower side band of the 28.45 kc. carrier supplied to the demodulator 524. The demodulator 524 is connected to the 28.45 kc. carrier oscillator 528 by the oscillator pad 527, whereby the required intensity of the 28.45 kc. carrier is impressed thereupon; the demodulator 524 being of the balanced type, the envelope of the lower side band of the 28.45 kc. carrier, determined by the audio frequency signals received from the calling subscriber substation in the manual exchange 10, is produced and passes through the receiving low pass filter 525 to the receiving amplifier 526. The receiving low pass filter 525 passes audio frequency, the audio frequency signal from the calling subscriber substation in the manual exchange 10; and this signal is amplified by the receiving amplifier 526 and supplied to the hybrid coil 530. Finally, the audio frequency signal is transmitted by the hybrid coil 530 over the line conductors C201 and C202 and, consequently, over the previously traced connection, including the trunk circuit 203TC, the incoming trunk 320, the incoming selector 360, the trunk 371, the connector 370 and the subscriber line 330 to the called subscriber substation T in the automatic exchange 20.

Also at this time audio frequency signals received from the called subscriber substation T in the automatic exchange 20 pass over the subscriber line 330, the connector 370, the trunk 371, the incoming selector 360 and the incoming trunk 320 to the trunk circuit 203TC, and thence by way of the line conductors C201 and C202 to the hybrid coil 530 in the carrier equipment 503E. The audio frequency signals then pass through the transmission low pass filter 541 via the input pad 542 to the modulator 543. The transmission low pass filter 541 insures the passage of only audio frequency signals; while the input pad 542 determines the intensity of the audio frequency signals impressed upon the modulator 543. As previously noted, the modulator 543 is connected to the 9.35 kc. carrier oscillator 548 by the oscillator pad 547 which maintains the desired intensity of the 9.35 kc. carrier impressed upon the modulator 543. The modulator 543 is of the balanced type, whereby modulated 9.35 kc. carrier is passed through the output pad 544 and the attenuation equalizer 545 to the transmission band pass filter 546. The output pad 544 establishes the intensity of the modulated 9.35 kc. carrier supplied to the transmission band pass filter 546; while the attenuation equalizer 545 compensates for the unequal attenuation of the high frequency carrier signals on the line 400. The transmission band pass filter 546 transmits the lower side band of the 9.45 kc. carrier (6.5 to 9.1 kc.), blocking the upper side band thereof and supplying the transmission line amplifier 517. The transmission line amplifier 517 amplifies the lower side band of the 9.35 kc. carrier and passes it through the transmission direction filter 515 and the high pass line filter 516 to the line 400. The lower side band of the 9.35 kc. carrier on the line 400 passes through the high pass line filter 413 and the receiving direction filter 414 to the receiving line amplifier 416. The receiving line amplifier 416 amplifies the lower side band of the 9.35 kc. carrier and passes it through the receiving band pass filter 421, the attenuation equalizer 422 and the gain control 423 to the demodulator 424. The receiving band pass filter 421 passes the lower side band of the 9.35 kc. carrier (6.5 to 9.1 kc.); and the attenuation equalizer 422 compensates for the unequal attenuation of the high frequency carrier signals on the line 400; while the gain control 423 establishes the desired intensity of the lower side band of the 9.35 kc. carrier supplied to the demodulator 424. The demodulator 424 is connected to the 9.35 kc. carrier oscillator 428 by the oscillator pad 427, whereby the required intensity of the 9.35 kc. carrier is impressed thereupon; the demodulator 424 being of the balanced type, the envelope of the lower side band of the 9.35 kc. carrier, determined by the audio frequency signals received from the called subscriber substation in the automatic exchange 20, is produced and passes through the receiving low pass filter 425 to the receiving amplifier 426. The receiving low pass filter 425 passes audio frequency, the audio frequency signal from the called subscriber substation in the automatic exchange 20; and this signal is amplified by the receiving amplifier 426 and supplied to the hybrid coil 430. Finally, the audio frequency signal is transmitted by the hybrid coil 430 over the line conductors C191 and C192 and, consequently, over the previously traced connection, including the trunk circuit 103TC and the cord circuit 101 to the calling subscriber substation in the manual exchange 10.

Now assuming that the called subscriber substation T in the automatic exchange 20 is busy when the connector 370 operates in the manner previously explained to select the subscriber line 330 extending thereto, connector 370 operates in order to cause busy tone current to be returned over the previously traced connection including the trunk circuit 203TC to the hybrid coil 530 in the carrier equipment 503E. This audio frequency signal then passes through the transmitting communication channel in the carrier equipment 503E in order to cause the lower side band of the 9.35 kc. carrier to be impressed upon the line 400, in the manner previously explained, which lower side band of the 9.35 kc. carrier then passes through the receiving communication channel in the carrier equipment 403W, whereby an audio frequency signal, the busy tone signal, is returned over the trunk circuit 103TC and the cord circuit 101 to the operator headset 113 at the switchboard 100, in the manner previously explained. At this time the operator at the switchboard 100 advises the subscriber at the calling subscriber substation in the manual exchange 10 that the desired connection cannot be had immediately due to the busy condition of the called subscriber substation T in the automatic exchange 20, and then proceeds to withdraw the plugs P103 and P102 of the cord circuit 101 from the associated jacks. When the plug P102 is withdrawn from the jack J151 the apparatus involved in the connection extending toward the called subscriber substation T in the automatic exchange 20 is released, in a manner more fully described hereinafter; and when the plug P103 is withdrawn from the associated jack the connection to the calling subscriber substation in the manual exchange 10 is taken down.

At the conclusion of the connection, when the subscriber at the calling subscriber substation in the manual exchange 10 replaces the receiver of the telephone instrument thereat upon its associated switchhook, the previously mentioned circuit for maintaining operated the supervisory relay R140 in the cord circuit 101 is interrupted, whereupon the latter relay restores in order to complete, at the contacts 141, the previously mentioned circuit for illuminating the supervisory lamp L112 in the cord circuit 101. When the supervisory lamp L112 is thus illuminated it renders to the operator switchboard 100 disconnect supervision, whereupon the operator at the switchboard 100 withdraws the plug P103 of the cord circuit 101 from the associated jack, taking down the connection to the calling subscriber substation in the manual exchange 10.

First assuming that the subscriber at the called subscriber substation T in the automatic exchange 20 replaces the receiver of the telephone instrument thereat upon its associated switchhook before the operator at the switchboard 100 withdraws the plug P102 of the cord circuit 101 from the associated jack J151 terminating the trunk circuit 103TC, the connector 370 operates to reverse the polarity over the trunk 371, the incoming selector 360 and the incoming trunk 320 to the right-hand winding of the answer relay R265 in the trunk circuit 203TC, causing the latter relay to restore. Upon restoring, the answer relay R265 recompletes, at the contacts 266, the previously traced termination circuit, including the resistor 225 and the condenser 218, across the line conductors C202 and C201 extending into the carrier equipment 503E; and interrupts, at the contacts 267, the previously traced circuit for maintaining operated the supervisory relay R285, thereby to cause the latter relay to restore shortly thereafter, it being of the slow-to-release type. Upon restoring, the supervisory relay R285 interrupts, at the contacts 287, the previously traced path for applying battery potential by way of the resistor 229 to the signal-out conductor C203 extending to the carrier equipment 503E in order to bring about the restoration of the signal-out relay R561 therein. Upon restoring, the signal-out relay R561 interrupts, at the contacts 562, the plate circuit for the transmitting amplifier 563 in order to interrupt the transmission, over the transmitting signal channel in the carrier equipment 503E, of the 9.35 kc. carrier to the line 400. When the 9.35 kc. carrier is thus removed from the line 400 and, consequently, from the receiving signal channel in the carrier equipment 403W, the signal-in relay R456 therein reoperates, in the manner previously explained, interrupting, at the contacts 457, the path for applying ground potential to the signal-in conductor C194 extending to the trunk circuit 103TC. When ground potential is thus removed from the signal-in conductor C194 the previously traced circuit for energizing the lower winding of the signal-in relay R180 in the trunk circuit 103TC is interrupted, causing the latter relay to restore. Upon restoring, the signal-in relay R180 interrupts, at the contacts 182, the previously mentioned multiple circuit for illuminating the busy lamp L153; and recompletes, at the contacts 181, the previously traced circuit for energizing the upper winding of the sleeve relay R160 in multiple with the lower winding thereof and, consequently, in series with the winding of the supervisory relay R130 in the cord circuit 101. When this low resistance circuit is thus completed the supervisory relay R130 operates to recomplete, at the contacts 131, the previously mentioned circuit for illuminating the supervisory lamp L111, thereby to render to the operator at the switchboard 100 disconnect supervision.

Upon receiving disconnect supervision the operator at the switchboard 100 withdraws the plug P102 of the cord circuit 101 from the associated jack J151, thereby interrupting the series circuit for maintaining operated the supervisory relay R130 in the cord circuit 101 and the sleeve relay R160 in the trunk circuit 103TC. At this time the supervisory relay R130 restores, interrupting, at the contacts 131, the previously mentioned circuit for illuminating the supervisory lamp L111, whereby the cord circuit 101 is restored to its normal condition. Also, when the plug P102 is withdrawn from the jack J151, the contacts 151′ thereof are operated into open circuit relation, interrupting the previously mentioned circuit for maintaining operated the jack relay R170, in order to cause the latter relay to restore shortly thereafter, it being of the slow-to-release type. Upon restoring, the sleeve relay R160 interrupts, at the contacts 161, the previously traced path for applying battery potential by way of the resistor 167 to the signal-out conductor C193 extending to the carrier equipment 403W; and recompletes, at the contacts 164, the previously mentioned termination circuit, including the resistor 169, across the line conductors C191 and C192 extending to the carrier equipment 403W. Also, the jack relay R170 interrupts, at the contacts 173, the previously mentioned original circuit for illuminating the busy lamp L153, thereby to indicate that the trunk circuit 103TC is idle and available for use at this time.

When resistance battery potential in the trunk circuit 103TC is removed from the signal-out conductor C193 the previously traced circuit for maintaining operated the signal-out relay R461 in the carrier equipment 403W is interrupted. Upon restoring, the signal-out relay R461 interrupts, at the contacts 462, the plate circuit for the transmitting amplifier 463 in order to interrupt the transmission, over the transmitting signal channel in the carrier equipment 403W, of the 28.45 kc. carrier to the line 400. When the 28.45 kc. carrier is thus removed from the line 400 and, consequently, from the receiving signal channel in the carrier equipment 503E, the signal-in relay R556 therein reoperates, in the manner previously explained, interrupting, at the contacts 557, the path for applying ground potential to the signal-in conductor C204 extending to the trunk circuit 203TC. When ground potential is thus removed from the signal-in conductor C204 the previously traced circuit for maintaining operated the signal-in relay R280 in the trunk circuit 203TC is interrupted, causing the latter relay to restore.

Upon restoring, the signal-in relay R280 interrupts, at the contacts 281, the previously traced loop circuit extending by way of the incoming trunk 320 to the incoming selector 360 and thence by way of the trunk 371 to the connector 370, thereby to bring about the release of the connector 370. When the connector 370 is thus released ground potential therein is removed from the control conductor C334 of the subscriber line 330 extending to the line circuit 335, whereby battery potential in the line circuit 335 is applied to the control conductor C334, thereby marking the subscriber line 330 extending to the subscriber substation T as idle to the connectors in the group, including the connector 370, having access thereto. Also, when the connector 370 is released ground potential is removed from the control conductor of the trunk 371, bringing about the release of the incoming selector 360 and the consequent removal of ground potential from the control conductor C323 of the incoming trunk 320. When ground potential is removed from the control conductor C323 of the incoming trunk 320 the previously traced multiple circuits for energizing the left-hand winding of the answer relay R265 and the upper winding of the switch relay R270 are interrupted. Also, upon restoring, the signal-in relay R280 recompletes, at the contacts 282, the previously traced circuit for operating the dial relay R240; and interrupts, at the contacts 283, the previously mentioned circuit for maintaining operated the hold relay R220, whereby the latter relay restores shortly thereafter it being of the slow-to-release type.

Upon restoring, the hold relay R220 interrupts, at the contacts 222, the previously traced circuit for maintaining operated the dial relay R240, thereby to cause the latter relay to restore shortly thereafter, it being of the slow-to-release type. Further, the hold relay R220 interrupts, at the contacts 224, the previously traced circuit for energizing the lower winding of the switch relay R270, thereby to cause the latter relay to restore. Upon restoring, the switch relay R270 interrupts, at the contacts 272, 273 and 275, further points in the previously traced connection between the line conductors C202 and C201 extending to the carrier equipment 503E and the line conductors C321 and C322 of the incoming trunk 320 extending to the incoming selector 360; and recompletes, at the contacts 271 and 274, the previously traced normal connections, including the contacts 297 and 299, between the line conductors C202 and C201 and the line conductors C311 and C312 of the outgoing trunk 310 accessible to the outgoing selector 350. Further, the switch relay R270 interrupts, at the contacts 278, the previously traced path for applying ground potential to the control conductor C313 of the outgoing trunk 310; and recompletes, at the contacts 277, the previously traced normal path for applying battery potential by way of the impedance 228 to the control conductor C313, thereby to mark the outgoing trunk 310 as idle to the outgoing selectors 350, etc. having access thereto. At this time the trunk circuit 203TC is completely released and available for further use.

Now assuming that the operator at the switchboard 100 withdraws the plug P102 of the cord circuit 101 from the associated jack J151 terminating the trunk circuit 103TC before the subscriber at the called subscriber substation T in the automatic exchange 20 replaces the receiver of the telephone instrument thereat upon its associated switchhook, when the plug P102 is thus withdrawn from the jack J151 the sleeve relay R160 and the jack relay R170 in the trunk circuit 103TC and the supervisory relay R130 in the cord circuit 101 all restore, as previously noted. Upon restoring, the sleeve relay R160 interrupts, at the contacts 161, the previously traced path for applying battery potential by way of the resistor 167 to the signal-out conductor C193 in order to bring about the restoration of the signal-out relay R461 in the carrier equipment 403W, in the manner previously noted. Upon restoring, the signal-out relay R461 interrupts, at the contacts 462, the plate circuit for the transmitting amplifier 463 in order to interrupt the transmission over the transmitting signal channel in the carrier equipment 403W, of the 28.45 kc. carrier to the line 400. When the 28.45 kc. carrier is thus removed from the line 400 and, consequently, from the receiving signal channel in the carrier equipment 503E, the signal-in relay R556 therein reoperates, in the manner previously explained, interrupting, at the contacts 557, the path for applying ground potential to the signal-in conductor C204 extending to the trunk circuit 203TC. When ground potential is thus removed from the signal-in conductor C204 the previously traced circuit for maintaining operated the signal-in relay R280 in the trunk circuit 203TC is interrupted, causing the latter relay to restore.

Upon restoring, the signal-in relay R280 completes, at the contacts 282, a circuit, including the contacts 276 and 286, for energizing the upper winding of the supervisory relay R285; and interrupts, at the contacts 281, the previously traced loop circuit extending between the right-hand winding of the answer relay R265 and the connector 370 in order to bring about the release of the connector 370 and the incoming selector 360, in the manner previously explained. When the connector 370 is thus released in the event the subscriber at the called subscriber substation T has not replaced the receiver of the telephone instrument upon its associated switchhook at this time, the line circuit 335 individual to the subscriber line 330 operates in order to lock the subscriber line 330 out of service and to mark it as busy to the connectors in the group, including the connector 370, having access thereto.

When the incoming selector 360 is thus released ground potential is removed from the control conductor C323 of the incoming trunk 320, thereby to interrupt the previously traced multiple circuits for energizing the left-hand winding of the answer relay R265 and the upper winding of the switch relay R270. At this time the answer relay R265 restores, interrupting, at the contacts 267, the previously mentioned circuit for energizing the lower winding of the supervisory relay R285; however, the latter relay is maintained in its operated position at this time, due to the completed circuit for energizing the upper winding thereof. Further, upon restoring, the signal-in relay R280 interrupts, at the contacts 283, the previously mentioned circuit for maintaining operated the hold relay R220, thereby to cause the latter relay to restore shortly thereafter, it being of the slow-to-release type. Finally, the signal-in relay R280, upon restoring, completes, at the contacts 282, the previously traced circuit for operating the dial relay R240. Upon restoring, the hold relay R220 brings about the restoration of the dial relay R240 shortly thereafter, as previously noted, and interrupts, at the contacts 224, the previously traced circuit for energizing the lower winding of the switch relay R270 in order to cause the latter relay to restore. Upon restoring, the switch relay R270 interrupts, at the contacts 276, the previously traced circuit for energizing the upper winding of the supervisory relay R285, thereby to cause the latter relay to restore shortly thereafter, it being of the slow-to-release type. Upon restoring, the supervisory relay R285 interrupts, at the contacts 287, the previously traced path for applying battery potential by way of the resistor 229 to the signal-out conductor C293 extending to the carrier equipment 503E. At this time the trunk circuit 203TC is completely released and is available for further used.

When ground potential is removed from the control conductor C203 the previously traced circuit for maintaining operated the signal-out relay R561 in the carrier equipment 503E is interrupted, causing the latter relay to restore. Upon restoring, the signal-out relay R561 interrupts, at the contacts 562, the plate circuit for the transmitting amplifier 563 in order to interrupt the transmission, over the transmitting signal channel in the carrier equipment 503E, of the 9.35 kc. carrier to the line 400. When the 9.35 kc. carrier is thus removed from the line 400 and, consequently, from the receiving signal channel in the carrier equipment 403W, the signal-in relay R456 therein reoperates, in the manner previously explained, interrupting, at the contacts 457, the path for applying ground potential to the signal-in conductor C194 extending to the trunk circuit 103TC. When ground potential is thus removed from the signal-in conductor C194 the previously traced circuit for energizing the lower winding of the signal-in relay R180 in the trunk circuit 103TC is interrupted, causing the latter relay to restore. Upon restoring, the signal-in relay R180 interrupts, at the contacts 182, the previously mentioned alternative circuit for illuminating the busy lamp L153, in order to extinguish the busy lamp L153, thereby to indicate that the trunk circuit 103TC is idle an available for further use at this time.

Considering now the extension of a connection between the automatic exchange 20 and the manual exchange 10, and assuming that a call is initiated at the calling subscriber substation T in the automatic exchange 20, the line circuit 335 individual to the subscriber line 330 extending to the calling subscriber substation T operates in order to place battery potential upon the control conductor C333 of the subscriber line 330 and ground potential upon the start conductor C336 extending to the distributor 340 associated with the group of finder-selector links, including the link illustrated, and comprising the finder 342 and the selector 341. The distributor 340 assigns an idle one of the finder-selector links mentioned, such, for example, as that illustrated, and initiates operation of the finder 342 thereof, whereby the finder 342 operates to seize the subscriber line 330 extending to the calling subscriber substation T bringing about further operation of the line circuit 335, whereupon ground potential is placed upon the control conductor C334 of the subscriber line 330 in order to mark the subscriber line 330 as busy to the connectors in the group, including the connector 370, having access thereto. Also, the line circuit 335 releases the distributor 340 and the selector 341 is conditioned to be responsive to the first digit dialed at the calling subscriber substation T. Furthermore, it is noted that the calling subscriber substation T is included in a ten line group rendered a particular class of service, whereby the set of switch springs S344 in the finder 342 is actuated into engagement incident to operation of the finder 342 to seize the subscriber line 330 extending to the calling subscriber substation T. When the set of switch springs S344 is thus actuated the class tone conductor C346, to which a class tone indicative of the class of the calling subscriber substation T is subsequently impressed, is connected by way of the condenser 345 to the set of switch springs S343 in the selector 341; which set of switch springs S343 is operated further to connect the tone conductor C346 to the control conductor of a seized trunk, only in the event the selector 341 is operated in accordance with a predetermined first digit indicative of a trunk call. Thus, it will be understood that when the selector 341 is operated to seize the trunk 371 extending to the connector 370 when a local call is extended by way of the finder-selector link illustrated that the set of switch springs S343 is not operated to connect the class tone conductor C346 to the control conductor of the trunk 371 extending to the connector 370, since such operation would be of no utility in conjunction with the extension of a local call from the calling subscriber substation T.

However, continuing with the extension of the present call from the calling subscriber substation T when the subscriber thereat dials the first digit into the selector 341, the selector 341 operates in order to select first the corresponding group of trunks and then an idle trunk therein. For example, the selector 341 may operate to select the particular trunk 351 extending to the outgoing selector 350 in response to the first digit dialed therein, whereby the loop circuit from the calling subscriber substation T is extended into the outgoing selector 350. Also, since this is a trunk call the set of switch springs S343 in the selector 341 is actuated into engagement, thereby to extend the class tone conductor C346 over the control conductor of the trunk 351 to the control conductor of the outgoing selector 350. The outgoing selector 350 then responds to the second digit dialed at the calling subscriber substation T, selecting first the corresponding group of outgoing trunks and then an idle outgoing trunk therein. For example, the outgoing selector 350 may select the outgoing trunk 310 extending to the trunk circuit 203TC, whereby there is completed a loop circuit extending from the calling subscriber substation T to the line relay R290 in the trunk circuit 203TC; and the control conductor of the outgoing selector 350 is connected to the control conductor C313 of the outgoing trunk 310, for a purpose more fully explained hereinafter. In passing, it is noted that the outgoing trunk 310 is marked as idle to the outgoing selector 350 by the application of battery potential thereon over the previously traced path, including the contacts 213 and 277 and the impedance 228.

The loop circuit mentioned extends from ground by way of the lower winding of the line relay R290 and the contacts 299 to the line conductor C312 of the outgoing trunk 310, and from battery by way of the upper winding of the line relay R290 and the contacts 297 to the line conductor C311 of the outgoing trunk 310; and thence by way of the outgoing selector 350, the trunk 351, the selector 341, the finder 342 and the subscriber line 330 to the calling subscriber substation T. When this loop circuit is thus completed the line relay R290 operates to complete, at the contacts 292, a path for applying battery potential by way of the resistor 229 to the signal-out conductor C203 extending into the carrier equipment 503E in order to bring about operation of the signal-out relay R561 therein. Also, the line relay R290 interrupts, at the contacts 291, the previously traced termination circuit, including the resistor 225 and the condenser 218, across the line conductors C202 and C201 extending between the trunk circuit 203TC and the carrier equipment 503E. Further, the line relay R290 completes, at the contacts 292, an obvious circuit for operating the hold relay R210. Upon operating, the hold realy R210 completes, at the contacts 211, a path, including the contacts 221, the condenser 208, the contacts 242 and 252 and the condenser 218, for connecting the interrupted generator conductor C206 to the line conductor C202; and completes, at the contacts 212, a path, including the contacts 231, 243 and 254, for connecting ground potential to the line conductor C201; the line conductors C202 and C201 being connected by the contacts 271, 274 and 297, 299 to the line conductors C311 and C312 of the outgoing trunk 310, whereby ring-back tone current is returned over the previously traced loop circuit to the calling subscriber substation T in order to indicate to the subscriber thereat that the operator at the switchboard 100 in the manual exchange 10 is being rung. Also, the hold relay R210 completes, at the contacts 217, a path, including the contacts 236, for applying ground potential to the ringing machine start conductor C205 in order to initiate operation of the ringing machine. Further, the hold relay R210 interrupts, at the contacts 213, the previously traced path for applying battery potential by way of the impedance 228 to the control conductor C313 of the outgoing trunk 310; and completes, at the contacts 214, a path for applying ground potential by way of the lower winding of the tone relay R260 to the control conductor C313 of the outgoing trunk 310. When the above-traced path is completed the lower winding of the tone relay R260 is energized, causing the latter relay to operate and complete, at the contacts 261, an obvious path for applying ground potential to the tone start conductor C207, thereby to initiate operation of the tone generator, not shown, in order to cause a tone voltage to be applied to the class tone conductor C346 associated with the finder 342. Also, ground potential applied by way of the lower winding of the tone relay R260 to the control conductor C313 of the outgoing trunk 310 marks the outgoing trunk 310 as busy to the other outgoing selectors in the group, including the outgoing selector 350, having access thereto.

Upon operating, the signal-out relay R561 completes, at the contacts 562, the plate circuit for the transmitting amplifier 563 in order to cause the transmission, over the transmitting signal channel in the carrier equipment 503E, of the 9.35 kc. carrier to the line 400. When the 9.35 kc. carrier is thus transmitted over the line 400 it is received in the receiving signal channel of the carrier equipment 403W, bringing about the restoration of the signal-in relay R456 therein, in the manner previously explained. Upon restoring, the signal-in relay R456 completes, at the contacts 457, the previously mentioned path for applying ground potential to the signal-in conductor C194, thereby to complete the previously traced circuit for energizing the lower winding of the signal-in relay R180 in the trunk circuit 103TC. When the lower winding of the signal-in relay R180 is thus energized the latter relay operates shortly thereafter it being rendered slightly slow to operate by virtue of the completed path, including the contacts 175, for short-circuiting the upper winding thereof. Upon operating, the signal-in relay R180 completes, at the contacts 182, the previously mentioned path for illuminating the busy lamp L153 and an obvious multiple path, including the contacts 174, for illuminating the line lamp L152. The illumination of the busy lamp L153 indicates that the trunk circuit 103TC is busy at this time, while the illumination of the line lamp L152 indicates that a call is waiting to be answered on the trunk circuit 103TC at this time. When the operator at the switchboard 100 observes the illuminated line lamp L152 she selects an idle cord, such, for example, as the cord 101, operates the talk key K105 thereof, and inserts the plug P102 thereof into the jack J151 terminating the trunk circuit 103TC. When the plug P102 is thus inserted into the jack J151 the contacts 151′ of the jack J151 are actuated into engagement, effecting operation of the jack relay R170, in the manner previously explained. Also, at this time the previously traced circuit for energizing the winding of the supervisory relay R130 in series with the lower winding of the sleeve relay R160 is completed, whereby the sleeve relay R160 operates. However, the supervisory relay R130 does not operate as it is of the marginal type, as previously noted. Upon operating, the jack relay R170 interrupts, at the contacts 174, the previously traced circuit for illuminating the line lamp L152 in order to indicate that the call on the trunk circuit 103TC has been answered; and completes, at the contacts 173, the previously mentioned multiple circuit for illuminating the busy lamp L153. Also, upon operating, the jack relay R170 completes, at the contacts 171, the previously traced path for applying battery potential by way of the resistor 167 to the signal-out conductor C193, in order to effect operation of the signal-out relay R461 in the carrier equipment 403W, in the manner previously explained.

Upon operating, the signal-out relay R461 completes, at the contacts 462, the plate circuit for the transmitting amplifier 463 in order to cause the transmission, over the transmitting signal channel in the carrier equipment 403W, of 28.45 kc. carrier to the line 400. When the 28.45 kc. carrier is thus transmitted over the line 400 it is received in the receiving signal channel of the carrier equipment 503E bringing about the restoration of the signal-in relay R556 therein, in the manner previously explained. Upon restoring, the signal-in relay R556 completes, at the contacts 557, the previously mentioned path for applying ground potential to the signal-in conductor C204, thereby to effect operation of the signal-in relay R280 in the trunk circuit 203TC, in the manner previously explained. Upon operating, the signal-in relay R280 completes, at the contacts 283, the previously mentioned circuit for operating the hold relay R220. Upon operating, the hold relay R220 interrupts, at the contacts 221, the previously traced path for connecting the interrupted generator conductor C206 to the line conductor C202, thereby to interrupt the return of ring-back tone current to the calling subscriber substation T in the automatic exchange 20 and to prevent the transmission of this ring-back tone current into the hybrid coil 530 in the carrier equipment 503E and the consequent transmission of the lower side band of the 9.35 kc. carrier via the transmitting communication channel in the carrier equipment 503E to the line 400. Also, the hold relay R220 completes, at the contacts 223, a circuit, including the contacts 215 and 234, for operating the timer relay R250. Upon operating, the timer relay R250 completes, at the contacts 253 and 255, a bridge connection including the condenser 218 for connecting the upper winding of the tone relay R260 across the line conductors C201 and C202. Accordingly, at this time, class tone from the conductor C346 is fed forwardly by way of the set of switch springs S344 in the finder 342, the condenser 345, the set of switch springs S343 in the selector 341, the control conductor of the trunk 351, the outgoing selector 350, the control conductor 313 of the outgoing trunk 310, the contacts 214, and the lower winding of the tone relay R260, to ground. The tone current traversing the lower winding of the tone relay R260 causes a corresponding tone voltage to be induced in the upper winding thereof and impressed across the line conductors C201 and C202 and, consequently, supplied to the hybrid coil 530 in the carrier equipment 503E. This class of tone signal applied to the hybrid coil 530 causes the lower side band of the 9.35 kc. carrier to be transmitted over the transmitting communication channel in the carrier equipment 503E to the line 400, in the manner previously explained, whereby the lower side band of the 9.35 kc. carrier on the line 400 is received in the receiving communication channel in the carrier equipment 403W and impressed upon the hybrid coil 430 therein, whereby the class of tone signal is impressed across the line conductors C191 and C192 extending into the trunk circuit 103TC. At this time the line conductors C191 and C192 are connected by way of the contacts 162 and 165 to the tip and the ring of the jack J151 and therefrom by way of the tip and the ring of the plug P102, the condensers 132 and 133, and the contacts of the talk key K105 to the headset 113 at the operator switchboard 100. Accordingly, the operator at the switchboard 100 receives the class tone signal indicative of the class of the calling subscriber substation T in the automatic exchange 20.

Also, upon operating, the timer relay R250 sets into vibration its armature RA251, whereby the contacts 256 are completed and interrupted periodically, completing and interrupting periodically an obvious circuit for energizing the winding of the timer relay R230, which latter relay being of the slow-to-operate type does not operate immediately. Shortly thereafter when the vibratory armature RA251 of the timer relay R250 settles down, the circuit for energizing the winding of the timer relay R230 is completed steadily causing the latter slow-to-operate relay to operate. Upon operating, the timer relay R230 completes, at the contacts 233, a holding circuit therefor, including the contacts 215 and 223. Also, the timer relay R230 interrupts, at the contacts 234, the previously traced circuit for operating the timer relay R250 in order to cause the latter relay to restore. Upon restoring, the timer relay R250 interrupts, at the contacts 253 and 255, the previously traced connection between the upper winding of the tone relay R260 and the line conductors C201 and C202, thereby to remove the application of the class of tone signal therefrom and, consequently, to arrest the transmission over the transmitting communication channel in the carrier equipment 503E to the line 400 of the lower side band of the 9.35 kc. carrier, whereby the class tone signal is removed by the carrier equipment 403W from the line conductors C191 and C192 and, consequently, from the headset 113 at the switchboard 100 in the manual exchange 10. Also, upon operating, the timer relay R230 interrupts, at the contacts 236, the previously mentioned path, including the contacts 217, for applying ground potential to the ringing machine start conductor C205; and completes, at the contacts 235, a holding circuit, including the contacts 217, for maintaining operated the hold relay R210. Further, the timer relay R230 completes, at the contacts 232, a circuit, including the contacts 283, for operating the reverse battery relay R295. Upon operating, the reverse battery relay R295 reverses, at the contacts 296, 297, 298 and 299, the polarity of the outgoing trunk 310 with respect to the line relay R290, which reversal of polarity over the outgoing trunk 310 may be utilized in the finder-selector link illustrated and included in the loop circuit extending to the calling subscriber substation T for metering purposes.

In view of the above description, it will be understood that the trunk circuit 203TC operates in order to cause a splash of class tone signal to be returned to the headset 113 at the operator switchboard 100 in the manual exchange 10 and, in the event the operator thereat fails to recognize the class tone signal, she may cause the same to be re-transmitted by momentarily disconnecting the cord circuit 101 from the trunk circuit 103TC. More particularly, the plug P102 of the cord circuit 101 is withdrawn from the jack J151 terminating the trunk circuit 103TC, permitting the jack relay R170 and the sleeve relay R160 in the trunk circuit 103TC to restore. Upon restoring, the sleeve relay R160 brings about the restoration of the signal-out relay R461 in the carrier equipment 403W and the consequent reoperation of the signal-in relay R556 in the carrier equipment 503E. Upon reoperating, the signal-in relay R556 brings about the restoration of the signal-in relay R280 in the trunk circuit 203TC and the consequent restoration of the hold relay R220 shortly thereafter, the latter relay being of the slow-to-release type. Upon restoring, the hold relay R220 interrupts, at the contacts 223, the previously traced holding circuit for maintaining operated the timer relay R230, whereby the latter relay restores, effecting the restoration of the reverse battery relay R295. Thereafter, when the plug P102 of the cord circuit 101 is again inserted into the jack J151, the jack relay R170 and the sleeve relay R160 reoperate in the trunk circuit 103TC, effecting reoperation of the signal-out relay R461 in the carrier equipment 403W and the consequent restoration of the signal-in relay R556 in the carrier equipment 503E. Upon restoring, the signal-in relay R556 effects reoperation of the signal-in relay R280 in the trunk circuit 203TC, and the consequent reoperation of the hold relay R220 followed by the reoperation of the timer relay R250, and then reoperation of the timer relay R230, and then the reverse battery relay R295. During the time interval that the timer relay R250 is operated before operation of the timer relay R230, as explained above, the class tone signal is again returned from the trunk circuit 203TC to the operator switchboard 100. At this time a connection has been completed from the calling subscriber substation T in the automatic exchange 20 to the operator switchboard 100 in the manual exchange 10.

The transmission of audio frequency signals between the operator switchboard 100 and the hybrid coil 430 in the carrier equipment 403W is identical to that previously explained; while the transmission of audio frequency signals between the calling subscriber substation T and the hybrid coil 530 in the carrier equipment 503E by way of the trunk circuit 203TC, the outgoing trunk 310, the outgoing selector 350, the trunk 351, the selector 341, the finder 342 and the subscriber line 330 is substantially identical to that previously explained. Finally, the transmission of the lower side band of the 9.35 kc. carrier from the transmitting communication channel in the carrier equipment 503E to the line 400 and the reception thereof by the receiving communication channel in the carrier equipment 403W, as well as the transmission of the lower side band of the 28.45 kc. carrier from the transmitting communication channel in the carrier equipment 403W to the line 400 and the reception thereof by the receiving communication channel in the carrier equipment 503E, are the same as previously described.

The operator at the switchboard 100 communicates with the subscriber at the calling subscriber substation T and learns the destination of the call, whereupon she inserts the plug P103 of the cord circuit 101 into the jack terminating the subscriber line extending to the called subscriber substation, and then operates the ring key K106 in the cord circuit 101, causing ringing current to be projected from the interrupted generator 107 over the line conductors of the subscriber line to the called subscriber substation. When the subscriber at the called subscriber substation in the manual exchange 10 answers the call by removing the receiver of the telephone instrument thereat from its associated switchhook, an obvious circuit is completed for energizing in series the upper and lower windings of the supervisory relay R140, assuming that the ring key K106 occupies its restored position at this time, the ring key K106 being operated intermittently in the manner noted. When the upper and lower windings of the supervisory relay R140 are thus energized, the latter relay operates to interupt, at the contacts 141, a previously completed circuit for illuminating the supervisory lamp L112, thereby rendering to the operator at the switchboard 100 answer supervision. The operator at the switchboard 100 then restores the talk key K105, whereby there is completed at this time a connection between the calling subscriber substation T in the automatic exchange 20 and the called subscriber substation in the manual exchange 10.

At the conclusion of the connection, when the subscriber at the called subscriber substation in the manual exchange 10 replaces the receiver of the telephone instrument thereat upon its associated switchhook, the previously mentioned circuit for maintaining operated the supervisory relay R140 in the cord circuit 101 is interrupted, whereupon the latter relay restores in order to complete, at the contacts 141, the previously mentioned circuit for illuminating the supervisory lamp L112 in the cord circuit 101. When the supervisory lamp L112 is thus illuminated it renders to the operator switchboard 100 disconnect supervision, whereupon the operator at the switchboard 100 withdraws the plug P103 of the cord circuit 101 from the associated jack, taking down the connection to the called subscriber substation in the manual exchange 10.

Now assuming that the subscriber at the calling subscriber substation T in the automatic exchange 20 replaces the receiver of the telephone instrument thereat upon its associated switchhook before the operator at the switchboard 100 withdraws the plug P102 of the cord circuit 101 from the associated jack J151 terminating the trunk circuit 103TC, the loop circuit extending between the calling subscriber substation T and the line relay R290 in the trunk circuit 203TC is interrupted, causing the latter relay to restore. Upon restoring, the line relay R290 recompletes, at the contacts 291, the previously traced termination circuit, including the resistor 225 and the condenser 218, across the line conductors C201 and C202 extending between the trunk circuit 203TC and the carrier equipment 503E. Also, the line relay R290 interrupts, at the contacts 292, the previously traced path for applying battery potential by way of the resistor 229 to the signal-out conductor C203, thereby to bring about the release of the signal-out relay R561 in the carrier equipment 503E and the reoperation of the signal-in relay R456 in the carrier equipment 403W, all in the manner previously explained. Upon reoperating, the signal-in relay R456 interrupts, at the contacts 457, the previously mentioned path for applying ground potential to the signal-in conductor C194 in order to bring about the release of the signal-in relay R180 in the trunk circuit 103TC, as previously explained. Upon restoring, the signal-in relay R180 completes, at the contacts 181, the previously traced low resistance circuit for energizing the upper winding of the sleeve relay R160 in the trunk circuit 103TC in series with the winding of the supervisory relay R130 in the cord circuit 101, causing the latter relay to operate in order to illuminate the supervisory lamp L111 in the cord circuit 101. The illumination of the supervisory lamp L111 in the cord circuit 101 gives disconnect supervision to the operator switchboard 100, whereby the operator thereat withdraws the plug P102 effecting the restoration of the sleeve relay R160 and the jack relay R170 in the trunk circuit 103TC and the restoration of the supervisory relay R130 in the cord circuit 101, in the manner previously explained. When the trunk circuit 103TC is thus released the signal-out relay R461 in the carrier equipment 403W is restored, effecting reoperation of the signal-in relay R556 in the carrier equipment 503E, in the manner previously described. Upon reoperating, the signal-in relay R556 interrupts, at the contacts 557, the previously mentioned path for applying ground potential to the signal-in conductor C204, thereby to effect restoration of the signal-in relay R280 in the trunk circuit 203TC, in the manner previously explained. Upon restoring, the signal-in relay R280 interrupts, at the contacts 283, the previously traced multiple circuits for maintaining operated the hold relay R220 and the reverse battery relay R295, whereby the reverse battery relay R295 restores immediately and the hold relay R220 restores shortly thereafter, it being of the slow-to-release type. Upon restoring, the reverse battery relay R295 restores, at the contacts 296, 297, 298 and 299, the normal polarity of the outgoing trunk 310 with respect to the line relay R290 in the trunk circuit 203TC. Also, upon restoring, the signal-in relay R280 effects operation of the dial relay R240; and upon restoring, the hold relay R220 effects the restoration of the dial relay R240, in the manner previously explained. Also, upon restoring, the hold relay R220 interrupts, at the contacts 223, the circuit for maintaining operated the timer relay R230; and, upon restoring, the timer relay R230 interrupts, at the contacts 235, the previously traced holding circuit for maintaining operated the hold relay R210, whereby the latter relay restores shortly thereafter it being of the slow-to-release type. Upon restoring, the hold relay R210 interrupts, at the contacts 214, the previously traced circuit for maintaining operated the tone relay R260; and recompletes, at the contacts 213, the previously traced path for applying battery potential by way of the impedance 228 to the control conductor C313 of the outgoing trunk 310. When ground potential is removed from the control conductor C313 of the outgoing trunk 310, the outgoing selector 350, the selector 341 and the finder 342 are released; and the application of battery potential to the control conductor C313 marks the outgoing trunk 310 as idle to the outgoing selectors in the group, including the outgoing selector 350, having access thereto. When the selector 341 is thus released the set of switch springs S343 is actuated into open circuit position, and when the finder 342 is thus released the set of switch spring S344 is actuated into open circuit position. Also, when the finder 342 is thus released ground potential is removed from the control conductor C333 of the subscriber line 330, causing operation of the line circuit 335 to apply battery potential to the control conductor C334 thereof, whereby the subscriber line 330 extending to the subscriber substation T is marked as idle to the connectors in the group, including the connector 370, having access thereto.

Now assuming that the operator at the switchboard 100 withdraws the plug P102 of the cord circuit 101 from the associated jack J151 terminating the trunk circuit 103TC before the subscriber at the calling subscriber substation T in the automatic exchange 20 replaces the receiver of the telephone instrument thereat upon its associated switchhook, when the plug P102 is thus withdrawn from the jack J151 the sleeve relay R160 and the jack relay R170 in the trunk circuit 103TC restore, in the manner previously explained. Upon restoring, the sleeve relay R160 interrupts, at the contacts 161, the previously traced path for applying battery potential by way of the resistor 167 to the signal-out conductor C193, in order to bring about the restoration of the signal-out relay R461 in the carrier equipment 403W and the consequent reoperation of the signal-in relay R556 in the carrier equipment 503E, in the manner previously explained. Upon reoperating, the signal-in relay R556 interrupts, at the contacts 557, the previously mentioned path for applying ground potential to the signal-in conductor C204, thereby to effect the release of the signal-in-relay R280 in the trunk circuit 203TC, as previously explained. Upon restoring, the signal-in relay R280 effects the operation of the dial relay R240 and the restoration of the hold relay R220 and the reverse battery relay R295, as previously noted. Upon restoring, the hold relay R220 effects the restoration of the dial relay R240 and the timer relay R230, as previously noted. Upon restoring, the reverse battery relay R295 effects the reversal of polarity over the outgoing trunk 310.

Subsequently, when the subscriber at the calling subscriber substation T replaces the receiver of the telephone instrument thereat upon its associated switchhook, the loop circuit extending to the line relay R290 in the trunk circuit 203TC is interrupted, causing the latter relay to restore. Upon restoring, the line relay R290 interrupts, at the contacts 293, the previously traced circuit for maintaining operated the hold relay R210, in order to cause the latter relay to restore shortly thereafter, it being of the slow-to-release type. Upon restoring, the hold relay R210 effects the restoration of the tone relay R260 and the release of the outgoing selector 350, the selector 341 and the finder 342, all in the manner previously explained. Further, upon restoring, the line relay R290 interrupts, at the contacts 292, the previously traced path for applying battery potential by way of the resistor 229 to the signal-out conductor C203, thereby to effect the restoration of the signal-out relay R561 in the carrier equipment 503E and the consequent reoperation of the signal-in relay R456 in the carrier equipment 403W, in the manner previously explained. Upon reoperating, the signal-in relay R456 interrupts, at the contacts 457, the previously mentioned path for applying ground potential to the signal-in conductor C194, in order to bring about the restoration of the signal-in relay R180 in the trunk circuit 103TC, in the manner previously explained. At this time all of the equipment employed in the established connection between the calling subscriber substation T in the automatic exchange 20 and the called subscriber substation in the manual exchange 10 is completely released and available for further use.

Referring now more particularly to Fig. 8. The telephone system there illustrated comprises a manual exchange 30 serving a group of subscriber substations, not shown, and a manual exchange 40 serving a group of subscriber substations, not shown, and interconnected by a line 400 extending therebetween. The west end of the line 400 terminates in voice frequency equipment 412W disposed in or beyond the manual exchange 30; and the east end of the line 400 terminates in voice frequency equipment 512EX disposed in or beyond the manual exchange 40.

The manual exchange 30 comprises apparatus which is identical in every respect to the apparatus incorporated in the manual exchange 10 illustrated in Fig. 7, and identical reference characters have been employed to identify the same pieces of apparatus, although the common channel equipment is indicated more generally by the reference numeral 413′. The manual exchange 40 comprises an operator switchboard 100X identical in every respect to the operator switchboard 100 in the manual exchange 10 illustrated in Fig. 7; and three trunk circuits 101TCX, 102TCX and 103TCX identical in every respect to the corresponding trunk circuits 101TC, 102TC and 103TC in the manual exchange 10 illustrated in Fig. 7. Also, the manual exchange 40 comprises three units of individual channel carrier equipment 501EX, 502EX and 503EX identical in every respect to the three corresponding units of individual channel carrier equipment 501E, 502E and 503E, disposed in the automatic exchange 20 illustrated in Fig. 7, and respectively connected to the trunk circuits 101TCX, 102TCX and 103TCX. Finally, the manual exchange 40 comprises common channel equipment indicated generally by the reference number 513X and corresponding in every respect to the common channel carrier equipment disposed in the automatic exchange 20 and illustrated in greater detail in Fig. 7.

It will be understood that the extension of a connection from a calling subscriber substation in the manual exchange 30 via the operator switchboard 100 therein and over the line 400 to the operator switchboard 100X in the manual exchange 40, and thence to a called subscriber substation therein, is carried out in a manner identical to the extension of a connection in the opposite direction from a calling subscriber substation in the manual exchange 40 to a called subscriber substation in the manual exchange 30. Moreover, the operator at the switchboard 100 in the manual exchange 30 answers a call from a calling subscriber substation therein in precisely the same manner that the operator at the switchboard 100 in the manual exchange 10 answers a call from a calling subscriber substation therein. The operator at the switchboard 100 in the manual exchange 30 then selects an idle one of the trunk circuits 101TC, etc., to effect seizure of the line 400 and the consequent seizure of the corresponding trunk circuit 101TCX, etc., in the manual exchange 40, precisely in the same manner that the operator at the switchboard 100 in the manual exchange 10 selects an idle one of the trunk circuits 101TC, etc., to effect seizure of the line 400 and the consequent seizure of the corresponding trunk circuit 201TC in the automatic exchange 20. The operator at the switchboard 100X in the manual exchange 40 answers the call on the trunk circuit 101TCX, etc., and then completes the connection to the called subscriber substation therein, in precisely the same manner that the operator at the switchboard 100 in the manual exchange 10 answers a call on one of the trunk circuits 101TC, etc. and completes the connection to the called subscriber substation therein. The release of the established connection between the calling subscriber substation in the manual exchange 30 and the called subscriber substation in the manual exchange 40 is brought about by the operators at the switchboards 100 and 100X respectively therein, and precisely in the manner explained in conjunction with the release of an established connection by the operator at the switchboard 100 in the manual exchange 10.

In passing, it is noted that in the telephone system illustrated in Fig. 8 it is well to modify the cord circuits disposed at the operator switchboard 100 in the manual exchange 30 and at the operator switchboard 100X in the manual exchange 40 in a minor particular, by eliminating the dials and dial keys therein since the arrangement including the dials and dial keys in the cord circuits mentioned, and illustrated in the cord circuit 101 disposed in the manual exchange 10 of Fig. 1, has utility only when a connection is to be extended from the generator switchboard 100 in the manual exchange 10 to a called subscriber substation in the automatic exchange 20.

Referring now more particularly to Fig. 9, the telephone system there illustrated comprises an automatic exchange 50 serving a group of subscriber substations, including the subscriber substation T, and an automatic exchange 60 serving a group of subscriber substations, including the subscriber substation TX, and interconnected by a line 400 extending therebetween. The west end of the line 400 terminates in voice frequency equipment 412WX disposed in or beyond the automatic exchange 60, and the east end of the line 400 terminates in voice frequency equipment 512E disposed in or beyond the automatic exchange 50.

The automatic exchange 50 comprises apparatus which is identical in every respect to the apparatus incorporated in the automatic exchange 20 illustrated in Fig. 7, and identical reference characters have been employed to identify the same pieces of apparatus, although the common channel equipment is indicated more generally by the reference numeral 513'. The automatic exchange 60 comprises automatic switching apparatus 300X identical in every respect to the automatic switching apparatus 300 illustrated in Fig. 7; and three trunk circuits 201TCX, 202TCX and 203TCX identical in every respect to the corresponding trunk circuits 201TC, 202TC and 203 TC in the automatic exchange 20 illustrated in Fig. 7. Also, the automatic exchange 60 comprises three units of individual channel carrier equipment 401WX, 402WX and 403WX identical in every respect to the three corresponding units of channel carrier equipment 401W, 402W and 403W disposed in the manual exchange 10 illustrated in Fig. 7, and respectively connected to the trunk circuits 201TCX, 202TCX and 203TCX. Finally, the automatic exchange 60 comprises common channel equipment indicated generally by the reference numeral 413X and corresponding in every respect to the common channel equipment disposed in the manual exchange 10 and illustrated in greater detail in Fig. 7.

It will be understood that the extension of a connection from a calling subscriber substation in the automatic exchange 50 via the automatic switching apparatus 300 therein and over the line 400 to the automatic switching apparatus 300X in the automatic exchange 60, and thence to a called subscriber substation therein, is carried out in a manner identical to the extension of a connection in the opposite direction from a calling subscriber substation in the automatic exchange 60 to a called subscriber substation in the automatic exchange 50. Moreover, a subscriber at a calling subscriber substation, such, for example, as the subscriber substation T in the automatic exchange 50, initiates a call and is connected to the automatic switching apparatus 300 therein, in precisely the same manner that the subscriber at the calling subscriber substation T in the automatic exchange 20 initiates a call and is connected to the automatic switching apparatus 300 therein. The subscriber at the calling subscriber substation T in the automatic exchange 50 then dials two digits into the automatic switching apparatus 300 therein in order to cause the automatic switching apparatus 300 therein to select an idle one of the trunk circuits 201TC, etc., therein and, consequently, the line 400 and the corresponding trunk circuit 201TCX, etc. in the automatic exchange 60, in precisely the same manner that the subscriber at the calling subscriber substation T in the automatic exchange 20 dials two digits into the automatic switching apparatus 300 therein, in order to cause the automatic switching apparatus 300 therein to select an idle one of the trunk circuits 201TC therein and, consequently, the line 400 and the corresponding trunk circuit 103TC in the manual exchange 10. When the trunk circuit 201TCX, etc. in the automatic exchange 60 is thus seized it is connected to the automatic switching apparatus 300X in precisely the same manner that the trunk 201TC, etc. in the automatic exchange 20 is connected to the automatic switching apparatus 300 in response to seizure thereof. At this time, the subscriber at the calling subscriber substation T in the automatic exchange 50 dials three digits corresponding to the directory number of the called subscriber substation in the automatic exchange 60, such, for example, as the subscriber substation TX, thereby to cause the automatic switching apparatus 300X therein to select the subscriber line 330X extending to the called subscriber substation TX in the automatic exchange 60; which operations are brought about in precisely the same manner as the automatic switching apparatus 300 in the automatic exchange 20 operates to seize the subscriber line 330 extending to the called subscriber substation T therein under control of the operator at the switchboard 100 in the manual exchange 10. Accordingly, at this time there is completed a connection between the calling subscriber substation T in the automatic exchange 50 and the called subscriber substation TX in the automatic exchange 60. The release of the established connection between the calling subscriber substation T in the automatic exchange 50 and the called subscriber substation TX in the automatic exchange 60 is brought about by the subscribers at the substations mentioned therein and precisely in the same manner explained in conjunction with the release of the established connection between the subscriber substation T in the automatic exchange 20 and the operator switchboard 100 in the manual exchange 10.

In passing, it is noted that in the telephone system illustrated in Fig. 9 it is well to modify the automatic switching apparatus 300 disposed in the automatic exchange 50 and the automatic switching apparatus 300X disposed in the automatic exchange 60 in a minor particular, by eliminating the class tone conductors in the finders of the finder-selector links incorporated therein, since the arrangement including the class tone conductors C346, etc. and illustrated in the automatic switching apparatus 300 disposed in the automatic exchange 20 of Fig. 3 has utility only when a connection is to be extended from a calling subscriber substation in the automatic exchange 20 to the operator switchboard 100 in the manual exchange 10.

In view of the foregoing it is apparent that there has been provided in telephone systems comprising two exchanges of the manual or the automatic types, improved trunk circuits disposed in the two exchanges and interconnected by multi-channel carrier equipment.

While there have been described what at present are considered to be the preferred embodiments of the invention, it will be understood that various modifications may be made therein, and it is intended to cover in the appended claims all such modifications as fall within the true spirit and scope of the invention.

What is claimed is:

1. In a telephone system including first and second exchanges and a line extending therebetween, said first exchange including a first operator switchboard and a first carrier current unit connected to said line, said second exchange including a second operator switchboard and a second carrier current unit connected to said line, said first switchboard including first call and supervisory signals and being provided with facilities for answering and for extending calls, said second switchboard including second call and supervisory signals and being provided with facilities for answering and for extending calls, said first unit including first transmitting and receiving signal channels and first transmitting and receiving communication channels, said second unit including second transmitting and receiving signal channels and second transmitting and receiving communication channels, means controllable from said first switchboard for completing a connection therefrom to said first transmitting and receiving communication channels, means responsive to the completion of said last-mentioned connection for operating said first supervisory signal and for transmitting a first carrier frequency signal over said first transmitting signal channel, means responsive to said first carrier frequency signal in said second receiving signal channel for operating said second call signal, means controllable from said second switchboard for completing a connection therefrom to said second transmitting and receiving communication channels, means responsive to the completion of said last-mentioned connection for arresting said second call signal and for transmitting a second carrier frequency signal over said second transmitting signal channel, means responsive to said second carrier frequency signal in said first receiving signal channel for arresting said first supervisory signal, means responsive to an audio signal from said first switchboard for transmitting a corresponding given side band of said first carrier frequency signal over said first transmitting communication channel, means responsive to said given side band of said first carrier frequency signal in said second receiving communication channel for transmitting a corresponding audio signal to said second switchboard, means responsive to an audio signal from said second switchboard for transmitting a corresponding given side band of said second carrier frequency signal over said second transmitting communication channel, and means responsive to said given side band of said second carrier frequency signal in said first receiving communication channel for transmitting a corresponding audio signal to said first switchboard.

2. In a telephone system including first and second exchanges and a line extending therebetween, said first exchange including a first operator switchboard and a first carrier current unit connected to said line, said second exchange including a second operator switchboard and a second carrier current unit connected to said line, said first switchboard including first call and supervisory signals and being provided with facilities for answering and for extending calls, said second switchboard including second call and supervisory signals and being provided with facilities for answering and for extending calls, said first unit including first transmitting and receiving signal channels and first transmitting and receiving communication channels, said second unit including second transmitting and receiving signal channels and second transmitting and receiving communication channels, means controllable from said first switchboard for completing a connection therefrom to said first transmitting and receiving communication channels, means responsive to the completion of said last-mentioned connection for operating said first supervisory signal and for transmitting a first carrier frequency signal over said first transmitting signal channel, means responsive to said first carrier frequency signal in said second receiving signal channel for operating said second call signal, means controllable from said second switchboard for completing a connection therefrom to said second transmitting and receiving communication channels, means responsive to the completion of said last-mentioned connection for arresting said second call signal and for transmitting a second carrier frequency signal over said second transmitting signal channel, and means responsive to said second carrier frequency signal in said first receiving signal channel for arresting said first supervisory signal, said first transmitting communication channel including a balanced modulator supplied with said first carrier frequency signal and responsive to an audio signal from said first switchboard for transmitting a corresponding modulated signal of said first carrier frequency signal, said second receiving communication channel including a balanced demodulator supplied with said first carrier frequency signal and responsive to said modulated signal of said first carrier frequency signal for transmitting a corresponding audio signal to said second switchboard, said second transmitting communication channel including a balanced modulator supplied with said second carrier frequency signal and responsive to an audio signal from said second switchboard for transmitting a corresponding modulated signal of said second carrier frequency signal, said first receiving communication channel including a balanced demodulator supplied with said second carrier frequency signal and responsive to said modulated signal of said second carrier frequency signal for transmitting a corresponding audio signal to said first switchboard.

3. In a telephone system including first and second exchanges and a line extending therebetween, said first exchange including a first operator switchboard and a first carrier current unit connected to said line, said second exchange including a second operator switchboard and a second carrier current unit connected to said line, said first switchboard including first call and supervisory signals and being provided with facilities for answering and for extending calls, said second switchboard including second call and supervisory signals and being provided with facilities for answering and for extending calls, said first units in said first exchange being paired with said second units in said second exchange to provide a corresponding plurality of channels between said exchanges, each of said units including transmitting and receiving signal channels and transmitting and receiving communication channels, means controllable from said first switchboard for selecting any one of said first units and for completing a connection therefrom to the transmitting and receiving communication channels in said one first unit, means responsive to the completion of said last-mentioned connection for operating the corresponding one of said first supervisory signals and for transmitting a first carrier frequency signal over the transmitting signal channel in said one first unit, means responsive to said first carrier frequency signal in the receiving signal channel in said paired one second unit for operating the corresponding one of said second call signals, means controllable from said second switchboard for completing a connection therefrom to the transmitting and receiving communication channels in said one second unit, means responsive to the completion of said last-mentioned connection for arresting said one second call signal and for transmitting a second carrier frequency signal over the transmitting signal channel in said one second unit, means responsive to said second carrier frequency signal in the receiving signal channel in said one first unit for arresting said one first supervisory signal, means responsive to an audio signal from said first switchboard for transmitting a corresponding modulated signal of said first carrier frequency signal over the transmitting communication channel in said one first unit, means responsive to said modulated signal of said first carrier frequency signal in the receiving communication channel in said one second unit for transmitting a corresponding audio signal to said second switchboard, means responsive to an audio signal from said second switchboard for transmitting a corresponding modulated signal of said second carrier frequency signal over the transmitting communication channel in said one second unit, and means responsive to said modulated signal of said second carrier frequency signal in the receiving communication channel in said one first unit for transmitting a corresponding audio signal to said first switchboard.

4. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means responsive to answering of the call at said called subscriber substation for completing a connection therefrom to said second transmitting and receiving communication channels and for transmitting a second carrier frequency signal over said second transmitting signal channel, means responsive to said second carrier frequency signal in said first receiving signal channel for returning answer supervision to said switchboard, means responsive to an audio signal from said switchboard for transmitting a corresponding given side band of said first carrier frequency signal over said first transmitting communication channel, means responsive to said given side band of said first carrier frequency signal in said second receiving communication channel for transmitting a corresponding audio signal to said called subscriber substation, means responsive to an audio signal from said called subscriber substation for transmitting a corresponding given side band of said second carrier frequency signal over said second transmitting communication channel, and means responsive to said given side band of said second carrier frequency signal in said first receiving communication channel for transmitting a corresponding audio signal to said switchboard.

5. In a telephone system including a first exchange provided with an operator switchboard and a first carrier unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means responsive to answering of the call at said called subscriber substation for completing a connection therefrom to said second transmitting and receiving communication channels and for transmitting a second carrier frequency signal over said second transmitting signal channel, and means responsive to said second carrier frequency signal in said first receiving signal channel for returning answer supervision to said switchboard, said first transmitting communication channel including a balanced modulator supplied with said first carrier frequency signal and responsive to an audio signal from said switchboard for transmitting a corresponding modulated signal of said first carrier frequency signal, said second receiving communication channel including a balanced demodulator supplied with said first carrier frequency signal and responsive to said modulated signal of said first carrier frequency signal for transmitting a corresponding audio signal to said called subscriber substation, said second transmitting communication channel including a balanced modulator supplied with said second carrier frequency signal and responsive to an audio signal from said called subscriber substation for transmitting a corresponding modulated signal of said second carrier frequency signal, said first receiving communication channel including a balanced demodulator supplied with said second carrier frequency signal and responsive to said modulated signal of said second carrier frequency signal for transmitting a corresponding audio signal to said switchboard.

6. In a telephone system including a first exchange provided with an operator switchboard and a plurality of first carrier current units and a second exchange provided with automatic switching apparatus and a plurality of subscriber substations and a plurality of second carrier current units, said switchboard being provided with facilities for answering and for extending calls, a line extending between said exchanges and connected to said units, said first units in said first exchange being paired with said second units in said second exchange to provide a corresponding plurality of channels between said exchanges, each of said units including transmitting and receiving signal channels and transmitting and receiving communication channels, means controllable from said switchboard for selecting any one of said first units and for completing a connection therefrom to the transmitting and receiving communication channels in said one first unit, means responsive to the completion of said last-mentioned connection for transmitting a first carrier frequency signal over the transmitting signal channel in said one first unit, means responsive to said first carrier frequency signal in the receiving signal channel in the paired one of said second units for seizing said switching apparatus, means controllable from said switchboard for transmitting pulses of said first carrier frequency signal corresponding to different digits over the transmitting signal channel in said one first unit, means responsive to said pulses of said first carrier frequency signal corresponding to different digits in the receiving signal channel of said one second unit for selectively operating said switching apparatus to extend the call to a called one of said subscriber substations, means responsive to answering of the call at said called subscriber substation for completing a connection therefrom to the transmitting and receiving communication channels in said one second unit and for transmitting a second carrier frequency signal over the transmitting signal channel in said one second unit, means responsive to said second carrier frequency signal in the receiving signal channel in said one first unit for returning answer supervision to said switchboard, means responsive to an audio signal from said switchboard for transmitting a corresponding modulated signal of said first carrier frequency signal over the transmitting communication channel in said one first unit, means responsive to said modulated signal of said first carrier frequency signal in the receiving communication channel in said one second unit for transmitting a corresponding audio signal to said called subscriber substation, means responsive to audio signal from said called subscriber substation for transmitting a corresponding modulated signal of said second carrier frequency signal over the transmitting communication channel in said one second unit, and means responsive to said modulated signal of said second carrier frequency signal in the receiving communication channel in said one first unit for transmitting a corresponding audio signal to said switchboard.

7. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means including said switching apparatus for testing the idle or busy condition of said called subscriber substation and controlled in the event said called subscriber substation is idle for projecting ringing current thereto and for returning an audio ring-back tone signal into said second transmitting communication channel, means responsive to answering of the call at said called subscriber substation for completing a connection therefrom to said second transmitting and receiving communication channnels and for transmitting a second carrier frequency signal over said second transmitting signal channel, means responsive to said second carrier frequency signal in said first receiving signal channel for returning answer supervision to said switchboard, means for transmitting an audio signal from said switchboard into said first transmitting communication channel, means responsive to an audio signal in said first transmitting communication channel for transmitting thereover a corresponding modulated signal of said first carrier frequency signal, means responsive to said modulated signal of said first carrier frequency signal in said second receiving communication channel for transmitting a corresponding audio signal to said called subscriber substation, means for transmitting an audio signal from said called subscriber substation into said second transmitting communication channel, means responsive to an audio signal in said second transmitting communication channel for transmitting thereover a corresponding modulated signal of said second carrier frequency signal, and means responsive to said modulated signal of said second carrier frequency signal in said first receiving communication channel for transmitting a corresponding audio signal to said switchboard.

8. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means including said switching apparatus for testing the idle or busy condition of said called subscriber substation and controlled in the event said called subscriber substation is busy for returning an audio busy tone signal into said second transmitting communication channel, means responsive to an audio signal in said second transmitting communication channel for transmitting thereover a corresponding modulated signal of said second carrier frequency signal, and means responsive to said modulated signal of said second carrier frequency signal in said first receiving communication channel for transmitting a corresponding audio signal to said switchboard.

9. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for selectively connecting to and disconnecting from said first transmitting and receiving communication channels, means responsive to the connection of said switchboard to said first transmitting and receiving communication channels for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means responsive to answering of the call at said called subscriber substation for completing a connection therefrom to said second transmitting and receiving communication channels and for transmitting a second carrier frequency signal over said second transmitting signal channel, means responsive to said second carrier frequency signal in said first receiving signal channel for returning answer supervision to said switchboard, means responsive to an audio signal from said switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said called subscriber substation, means responsive to an audio signal from said called subscriber substation for transmitting a corresponding modulated signal of said second carrier frequency signal over said second transmitting communication channel, means responsive to said modulated signal of said second carrier frequency signal in said first receiving communication channel for transmitting a corresponding audio signal to said switchboard, means responsive to the disconnection of said switchboard from said first transmitting and receiving communication channels for interrupting the transmission of said first carrier frequency signal over said first transmitting signal channel, and means responsive to the interruption of said first carrier frequency signal in said second receiving signal channel for releasing said switching apparatus.

10. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means responsive to answering of the call at said called subscriber substation for completing a connection therefrom to said second transmitting and receiving communication channels and for transmitting a second carrier frequency signal over said second transmitting signal channel, means responsive to said second carrier frequency signal in said first receiving signal channel for returning answer supervision to said switchboard, means responsive to an audio signal from said switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said called subscriber substation, means responsive to an audio signal from said called subscriber substation for transmitting a corresponding modulated signal of said second carrier frequency signal over said second transmitting communication channel, means responsive to said modulated signal of said second carrier frequency signal in said first receiving communication channel for transmitting a corresponding audio signal to said switchboard, means responsive to releasing of the call at said called subscriber substation for interrupting the transmission of said second carrier frequency signal over said second transmitting signal channel, and means responsive to the interruption of said second carrier frequency signal in said first receiving signal channel for returning release supervision to said switchboard.

11. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the completion of said last-mentioned connection for transmitting a second carrier frequency signal over said second transmitting signal channel, means responsive to said second carrier frequency signal in said first receiving signal channel for transmitting call supervision to said switchboard, means responsive to answering of the call at said switchboard for completing a connection therefrom to said first transmitting and receiving channels, means responsive to the completion of said last-mentioned connection for transmitting a first carrier frequency signal over said first transmitting signal channel, means responsive to said first carrier frequency signal in said second receiving signal channel for reversing the polarity of said connection to said calling subscriber substation, means responsive to an audio signal from said switchboard for transmitting a corresponding given side band of said first carrier frequency signal over said first transmitting communication channel, means responsive to said given side band of said first carrier frequency signal in said second receiving communication channel for transmitting a corresponding audio signal to said calling subscriber substation, means responsive to an audio signal from said calling subscriber substation for transmitting a corresponding given side band of said second carrier frequency signal over said second transmitting communication channel, and means responsive to said given side band of said second carrier frequency signal in said first receiving communication channel for transmitting a corresponding audio signal to said switchboard.

12. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the completion of said last-mentioned connection for transmitting a second carrier frequency signal over said second transmitting signal channel, means responsive to said second carrier frequency signal in said first receiving signal channel for transmitting call supervision to said switchboard, means responsive to answering of the call at said switchboard for completing a connection therefrom to said first transmitting and receiving channels, means responsive to the completion of said last-mentioned connection for transmitting a first carrier frequency signal over said first transmitting signal channel, and means responsive to said first carrier frequency signal in said second receiving signal channel for reversing the polarity of said connection to said calling subscriber substation, said first transmitting communication channel including a balanced modulator supplied with said first carrier frequency signal and responsive to an audio signal from said switchboard for transmitting a corresponding modulated signal of said first carrier frequency signal, said second receiving communication channel including a balanced demodulator supplied with said first carrier frequency signal and responsive to said modulated signal of said first carrier frequency signal for transmitting a corresponding audio signal to said calling subscriber substation, said second transmitting communication channel including a balanced modulator supplied with said second carrier frequency signal and responsive to an audio signal from said calling subscriber substation for transmitting a corresponding modulated signal of said second carrier frequency signal, said first receiving communication channel including a balanced demodulator supplied with said second carrier frequency signal and responsive to said modulated signal of said second carrier frequency signal for transmitting a corresponding audio signal to switchboard.

13. In a telephone system including a first exchange provided with an operator switchboard and a plurality of first carrier current units and a second exchange provided with automatic switching apparatus and a plurality of subscriber substations and a plurality of second carrier current units, said switchboard being provided with facilities for answering and for extending calls, a line extending between said exchanges, and connected to said units, said first units in said first exchange being paired with said second units in said second exchange to provide a corresponding plurality of channels between said exchanges, each of said units including transmitting and receiving signal channels and transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to select any one of said second units and to extend the connection to the transmitting and receiving communication channels therein, means responsive to the extension of said last-mentioned connection for transmitting a second carrier frequency signal over the transmitting signal channel in said one second unit, means responsive to said second carrier frequency signal in the receiving signal channel in the paired one of said first units for transmitting call supervision to said switchboard, means responsive to answering of the call at said switchboard for completing a connection therefrom to the transmitting and receiving communication channels in said one first unit and for transmitting a first carrier frequency signal over the transmitting signal channel in said one first unit, means responsive to said first carrier frequency signal in the receiving signal channel in said one second unit for reversing the polarity of said connection to said calling subscriber substation, means responsive to an audio signal from said switchboard for transmitting a corresponding modulated signal of said first carrier frequency signal over the transmitting communication channel in said one first unit, means responsive to said modulated signal of said first carrier frequency signal in the receiving communication channel in said one second unit for transmitting a corresponding audio signal to said calling subscriber substation, means responsive to an audio signal from said calling subscriber substation for transmitting a corresponding modulated signal of said second carrier frequency signal over the transmitting communication channel in said one second unit, and means responsive to said modulated signal of said second carrier frequency signal in the receiving communication channel in said one first unit for transmitting a corresponding audio signal to said switchboard.

14. In a telephone system including a first exchange provided with an operator switchboard and a first carrier current unit and a second exchange provided with automatic switching apparatus and a plurality of subscriber substations of different classes and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the extension of said last-mentioned connection for transmitting a second carrier frequency signal over said second transmitting signal channel, means responsive to said second carrier frequency signal in said first receiving signal channel for transmitting call supervision to said switchboard, means responsive to answering of the call at said switchboard for completing a connection therefrom to said first transmitting and receiving channels, means responsive to said last-mentioned connection for transmitting a first carrier frequency signal over said first transmitting signal channel, means responsive to said first carrier frequency signal in said second receiving signal channel for returning during a short time interval an audio class tone signal identifying the class of said calling subscriber substation into said second transmitting communication channel, means for transmitting an audio signal from said calling subscriber substation into said second transmitting communication channel, means responsive to an audio signal in said second transmitting communication channel for transmitting thereover a corresponding modulated signal of said second carrier frequency signal, means responsive to said modulated signal of said second carrier frequency signal in said first receiving communication channel for transmitting a corresponding audio signal to said switchboard, means for transmitting an audio signal from said operator switchboard into said first transmitting communication channel, means responsive to an audio signal in said first transmitting communication channel for transmitting thereover a corresponding modulated signal of said first carrier frequency signal, and means responsive to said modulated signal of said first carrier frequency signal in said second receiving communication channel for transmitting a corresponding audio signal to said calling subscriber substation.

15. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the extension of said last-mentioned connection for transmitting a second carrier frequency signal over said second transmitting signal channel, means responsive to said second carrier frequency signal in said first receiving signal channel for transmitting call supervision to said switchboard, means responsive to answering of the call at said switchboard for completing a connection therefrom to said first transmitting and receiving channels, means responsive to the completion of said last-mentioned connection for transmitting a first carrier frequency signal over said first transmitting signal channel, means responsive to said first carrier frequency signal in said second receiving signal channel for reversing the polarity of said connection to said calling subscriber substation, means responsive to an audio signal from said switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said calling subscriber substation, means responsive to an audio signal from said calling subscriber substation for transmitting a corresponding modulated signal of said second carrier frequency signal over said second transmitting communication channel, means responsive to said modulated signal of said second carrier frequency signal in said first receiving communication channel for transmitting a corresponding audio signal to said switchboard, means responsive to releasing of the call at said switchboard for interrupting the transmission of said first carrier frequency signal over said first transmitting signal channel, and means responsive to the interruption of said first carrier frequency signal in said second receiving signal channel for returning the polarity of said connection to said calling subscriber substation.

16. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a line extending between said exchanges and connected to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the extension of said last-mentioned connection for transmitting a second carrier frequency signal over said second transmitting signal channel, means responsive to said second carrier frequency signal in said first receiving signal channel for transmitting call supervision to said switchboard, means responsive to answering of the call at said switchboard for completing a connection therefrom to said first transmitting and receiving channels, means responsive to the completion of said last-mentioned connection for transmitting a first carrier frequency signal over said first transmitting signal channel, means responsive to said first carrier frequency signal in said second receiving signal channel for reversing the polarity of said connection to said calling subscriber substation, means responsive to an audio signal from said switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said calling subscriber substation, means responsive to an audio signal from said calling subscriber substation for transmitting a corresponding modulated signal of said second carrier frequency signal over said second transmitting communication channel, means responsive to said modulated signal of said second carrier frequency signal in said first receiving communication channel for transmitting a corresponding audio signal to said switchboard, means responsive to releasing of the call at said calling subscriber substation for interrupting the transmission of said second carrier frequency signal over said second transmitting signal channel, and means responsive to the interruption of said second carrier frequency signal in said first receiving signal channel for returning release supervision to said switchboard.

17. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means responsive to answering of the call at said one called second subscriber substation for completing a connection therefrom to said second transmitting and receiving communication channels and for transmitting a second carrier frequency signal over said second transmitting signal channel, means responsive to said second carrier frequency signal in said first receiving signal channel for reversing the polarity of said connection to said one calling first subscriber substation, means responsive to an audio signal from said one calling first subscriber substation for transmitting a corresponding given side band of said first carrier frequency signal over said first transmitting communication channel, means responsive to said given side band of said first carrier frequency signal in said second receiving communication channel for transmitting a corresponding audio signal to said one called second subscriber substation, means responsive to an audio signal from said one called second subscriber substation for transmitting a corresponding given side band of said second carrier frequency signal over said second transmitting communication channel, means responsive to said given side band of said second carrier frequency signal in said first receiving communication channel for transmitting a corresponding audio signal to said one calling first subscriber substation.

18. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means responsive to answering of the call at said one called second subscriber substation for completing a connection therefrom to said second transmitting and receiving communication channels and for transmitting a second carrier frequency signal over said second transmitting signal channel, and means responsive to said second carrier frequency signal in said first receiving signal channel for reversing the polarity of said connection to said one calling first subscriber substation, said first transmitting communication channel including a balanced modulator supplied with said first carrier frequency signal and responsive to an audio signal from said one calling first subscriber substation for transmitting a corresponding modulated signal of said first carrier frequency signal, said second receiving communication channel including a balanced demodulator supplied with said first carrier frequency signal and responsive to said modulated signal of said first carrier frequency signal for transmitting a corresponding audio signal to said one called second subscriber substation, said second transmitting communication channel including a balanced modulator supplied with said second carrier frequency signal and responsive to an audio signal from said one called second subscriber substation for transmitting a corresponding modulated signal of said second carrier frequency signal, said first receiving communication channel including a balanced demodulator supplied with said second carrier frequency signal and responsive to said modulated signal of said second carrier frequency signal for transmitting a corresponding audio signal to said one calling first subscriber substation.

19. In a telephone system including first and second exchanges and a line extending therebetween, said first exchange including first automatic switching apparatus and a plurality of first subscriber substations and a plurality of first carrier current units connected to said line, said second exchange including second automatic switching apparatus and a plurality of second subscriber substations and a plurality of second carrier current units connected to said line, said first units in said first exchange being paired with said second units in said second exchange to provide a corresponding plurality of channels between said exchanges, each of said units including transmitting and receiving signal channels and transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to select any one of said first units and to extend the connection to the transmitting and receiving communication channels therein, means responsive to the extension of said last-mentioned connection for transmitting a first carrier frequency signal over the transmitting signal channel in said one first unit, means responsive to said first carrier frequency signal in the receiving signal channel in the paired one of said second units for seizing said second switching apparatus, means responsive to another digit or digits dialed at said one calling first subscriber substation for transmitting pulses of said first carrier frequency signal corresponding to different digits over the transmitting signal channel in said one first unit, means responsive to said pulses of said first carrier frequency signal corresponding to different digits in the receiving signal channel in said one second unit for selectively operating said second switching apparatus to extend the call to a called one of said second subscriber substations, means responsive to answering of the call at said one called second subscriber substation for completing a connection therefrom to the transmitting and receiving communication channels in said one second unit and for transmitting a second carrier frequency signal over the transmitting signal channel in said one second unit, means responsive to said second carrier frequency signal in the receiving signal channel of said one first unit for reversing the polarity of said connection to said one calling first subscriber substation, means responsive to an audio signal from said one calling first subscriber substation for transmitting a corresponding modulated signal of said first carrier frequency signal over the transmitting communication channel in said one first unit, means responsive to said modulated signal of said first carrier frequency signal in the receiving communication channel in said one second unit for transmitting a corresponding audio signal to said one called second subscriber substation, means responsive to an audio signal from said one called second subscriber substation for transmitting a corresponding modulated signal of said second carrier frequency signal over the transmitting communication channel in said one second unit, and means responsive to said modulated signal of said second carrier frequency signal in the receiving communication channel of said one first unit for transmitting a corresponding audio signal to said one calling first subscriber substation.

20. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means including said second switching apparatus for testing the idle or busy condition of said one called second subscriber substation and controlled in the event said one called second subscriber substation is idle for projecting ringing current thereto and for returning an audio ring-back tone signal into said second transmitting communication channel, means responsive to answering of the call at said one called second subscriber substation for completing a connection therefrom to said second transmitting and receiving communication channels and for transmitting a second carrier frequency signal over said second transmitting signal channel, means responsive to said second carrier frequency signal in said first receiving signal channel for reversing the polarity of said connection to said one calling first subscriber substation, means for transmitting an audio signal from said one called second subscriber substation into said second transmitting communication channel, means responsive to an audio signal in said second transmitting communication channel for transmitting thereover a corresponding modulated signal of said second carrier frequency signal, means responsive to said modulated signal of said second carrier frequency signal in said first receiving communication channel for transmitting a corresponding audio signal to said one calling first subscriber substation, means for transmitting an audio signal from said one calling first subscriber substation into said first transmitting communication channel, means responsive to an audio signal in said first transmitting communication channel for transmitting thereover a corresponding modulated signal of said first carrier frequency signal, and means responsive to said modulated signal of said first carrier frequency signal in said second receiving communication channel for transmitting a corresponding audio signal to said one called second subscriber substation.

21. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means including said second switching apparatus for testing the idle or busy condition of said one called second subscriber substation and controlled in the event said one called second subscriber substation is busy for returning an audio busy tone signal into said second transmitting communication channel, means responsive to an audio signal in said second transmitting communication channel for transmitting thereover a corresponding modulated signal of said second carrier frequency signal, and means responsive to said modulated signal of said second carrier frequency signal in said first receiving communication channel for transmitting a corresponding audio signal to said one calling first subscriber substation.

22. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means responsive to answering of the call at said one called second subscriber substation for completing a connection therefrom to said second transmitting and receiving communication channels and for transmitting a second carrier frequency signal over said second transmitting signal channel, means responsive to said second carrier frequency signal in said first receiving signal channel for reversing the polarity of said connection to said one calling first subscriber substation, means responsive to an audio signal from said one calling first subscriber substation for transmitting a corresponding modulated signal of said first carrier frequency signal over said first transmitting communication channel, means responsive to said modulated signal of said first carrier frequency signal in said second receiving communication channel for transmitting a corresponding audio signal to said one called second subscriber substation, means responsive to an audio signal from said one called second subscriber substation for transmitting a correspondin modulated signal of said second carrier frequency signal over said second transmitting communication channel, means responsive to said modulated signal of said second carrier frequency signal in said first receiving communication channel for transmitting a corresponding audio signal to said one calling first subscriber substation, means responsive to releasing of the call at said one calling first subscriber substation for releasing said first switching apparatus, means responsive to the release of said first switching apparatus for interrupting the transmission of said first carrier frequency signal over said first transmitting signal channel, and means responsive to the interruption of said first carrier frequency signal in said second receiving signal channel for releasing said second switching apparatus.

23. In a telephone system including first and second exchanges and a line extending therebetween, said first exchange including first automatic switching apparatus and a plurality of first subscriber substations and a first carrier current unit connected to said line, said second exchange including second automatic switching apparatus and a plurality of second subscriber substations and a second carrier current unit connected to said line, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means responsive to answering of the call at said one called second subscriber substation for completing a connection therefrom to said second transmitting and receiving communication channels and for transmitting a second carrier frequency signal over said second transmitting signal channel, means responsive to said second carrier frequency signal in said first receiving signal channel for reversing the polarity of said connection to said one calling first subscriber substation, means responsive to an audio signal from said one calling first subscriber substation for transmitting a corresponding modulated signal of said first carrier frequency signal over said first transmitting communication channel, means responsive to said modulated signal of said first carrier frequency signal in said second receiving communication channel for transmitting a corresponding audio signal to said one called second subscriber substation, means responsive to an audio signal from said one called second subscriber substation for transmitting a corresponding modulated signal of said second carrier frequency signal over said second transmitting communication channel, means responsive to said modulated signal of said second carrier frequency signal in said first receiving communication channel for transmitting a corresponding audio signal to said one calling first subscriber substation, means responsive to releasing of the call at said one called second subscriber substation for interrupting the transmission of said second carrier frequency signal over said second transmitting signal channel, and means responsive to the interruption of said second carrier frequency signal in said first receiving signal channel for returning the polarity of said connection to said one calling first subscriber substation.

24. In a telephone system including first and second exchanges and a carrier frequency signal circuit, said first exchange including a plurality of first telephone stations and a first carrier current unit coupled to said carrier frequency signal circuit, said second exchange including a plurality of second telephone stations and a second carrier current unit coupled to said carrier frequency signal circuit, said first unit including first transmitting and receiving signal channels and first transmitting and receiving communication channels, said second unit including second transmitting and receiving signal channels and second transmitting and receiving communication channels, means controllable from any calling one of said first stations for completing a connection therefrom to said first transmitting and receiving communication channels, means responsive to the completion of said last-mentioned connection for rendering said first unit busy to other calling first stations and for transmitting a first carrier frequency signal over said first transmitting signal channel, means responsive to said first carrier frequency signal in said second receiving signal channel for rendering said second unit busy to calling second stations, means controllable from any called one of said second stations for completing a connection therefrom to said second transmitting and receiving communication channels, means responsive to the completion of said last-mentioned connection for maintaining said second unit busy to calling second stations and for transmitting a second carrier frequency signal over said second transmitting signal channel, means responsive to said second carrier frequency signal in said first receiving signal channel for maintaining said first unit busy to other calling first stations, means responsive to an audio signal from said one calling first station for transmitting a corresponding modulated signal of said first carrier frequency signal over said first transmitting communication channel, means responsive to said modulated signal of said first carrier frequency signal in said second receiving communication channel for transmitting a corresponding audio signal to said one called second station, means responsive to an audio signal from said one called second station for transmitting a corresponding modulated signal of said second carrier frequency signal over said second transmitting communication channel, and means responsive to said modulated signal of said second carrier frequency signal in said first receiving communication channel for transmitting a corresponding audio signal to said one calling first station.

25. In a telephone system including first and second exchanges and a carrier frequency signal circuit, said first exchange including a first operator switchboard and a first carrier current unit coupled to said carrier frequency signal circuit, said second exchange including a second operator switchboard and a second carrier current unit coupled to said carrier frequency signal circuit, said first switchboard including first call and supervisory signals and being provided with facilities for answering and for extending calls, said second switchboard including second call and supervisory signals and being provided with facilities for answering and for extending calls, said first unit including first transmitting and receiving signal channels and first transmitting and receiving communication channels, said second unit including second transmitting and receiving signal channels and second transmitting and receiving communication channels, means controllable from said first switchboard for completing a connection therefrom to said first transmitting and receiving communication channels, means responsive to the completion of said last-mentioned connection for operating said first supervisory signal and for transmitting a first carrier frequency signal over said first transmitting signal channel, means responsive to said first carrier frequency signal in said second receiving signal channel for operating said second call signal, means controllable from said second switchboard for completing a connection therefrom to said second transmitting and receiving communication channels, means responsive to the completion of said last-mentioned connection for arresting said second call signal and for transmitting a second carrier frequency signal over said second transmitting signal channel, means responsive to said second carrier frequency signal in said first receiving signal channel for arresting said first supervisory signal, means responsive to an audio signal from said first switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said second switchboard, means responsive to an audio signal from said second switchboard for transmitting a corresponding modulated signal of said second carrier frequency signal over said second transmitting communication channel, and means responsive to said modulated signal of said second carrier frequency signal in said first receiving communication channel for transmitting a corresponding audio signal to said first switchboard.

26. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a carrier frequency signal circuit coupled to said units, said first unit including first transmitting and receiving signal channels and first transmitting and receiving communication channels, said second unit including second transmitting and receiving signal channels and second transmitting and receiving communication channels, means controllable from said switchboard for completing a connection therefrom to said first transmitting and receiving communication channels, means responsive to the completion of said last-mentioned connection for transmitting a first carrier frequency signal over said first transmitting signal channel, means responsive to said first carrier frequency signal in said second receiving signal channel for seizing said switching apparatus, means controllable from said switchboard for transmitting pulses of said first carrier frequency signal corresponding to different digits over said first transmitting signal channel, means responsive to said pulses of said first carrier frequency signal corresponding to different digits in said second receiving signal channel for selectively operating said switching apparatus to extend the call to a called one of said subscriber substations, means responsive to answering of the call at said called subscriber substation for completing a connection therefrom to said second transmitting and receiving communication channels and for transmitting a second carrier frequency signal over said second transmitting signal channel, means responsive to said second carrier frequency signal in said first receiving signal channel for returning answer supervision to said switchboard, means responsive to an audio signal from said switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said called subscriber substation, means responsive to an audio signal from said called subscriber substation for transmitting a corresponding modulated signal of said second carrier frequency signal over said second transmitting communication channel, and means responsive to said modulated signal of said second carrier frequency signal in said first receiving communication channel for transmitting a corresponding audio signal to said switchboard.

27. In a telephone system including a first exchange provided with an operator switchboard and a first carrier current unit and a second exchange provided with automatic switching apparatus and a plurality of subscriber substations and a second carrier current unit, said switchboard being provided with facilities for answering and for extending calls, a carrier frequency signal circuit coupled to said units, said first unit including first transmitting and receiving signal channels and first transmitting and receiving communication channels, said second unit including second transmitting and receiving signal channels and second transmitting and receiving communication channels, means responsive to initiation of a call at a calling one of said subscriber substations for connecting said calling subscriber substation to said switching apparatus, means responsive to a digit or digits dialed at said calling subscriber substation for operating said switching apparatus to extend the connection to said second transmitting and receiving communication channels, means responsive to the extension of said last-mentioned connection for transmitting a second carrier frequency signal over said second transmitting signal channel, means responsive to said second carrier frequency signal in said first receiving signal channel for transmitting call supervision to said operator switchboard, means responsive to answering of the call at said operator switchboard for completing a connection therefrom to said first transmitting and receiving channels, means responsive to the completion of said last-mentioned connection for transmitting a first carrier frequency signal over said first transmitting signal channel, means responsive to said first carrier frequency signal in said second receiving signal channel for reversing the polarity of said connection to said calling subscriber substation, means responsive to an audio signal from said operator switchboard for transmitting a corresponding modulated signal of said first carrier frequency signal over said first transmitting communication channel, means responsive to said modulated signal of said first carrier frequency signal in said second receiving communication channel for transmitting a corresponding audio signal to said calling subscriber substation, means responsive to an audio signal from said calling subscriber substation for transmitting a corresponding modulated signal of said second carrier frequency signal over said second transmitting communication channel, and means responsive to said modulated signal of said second carrier frequency signal in said first receiving communication channel for transmitting a corresponding audio signal to said operator switchboard.

28. In a telephone system including first and second exchanges and a carrier frequency signal circuit, said first exchange including first automatic switching apparatus and a plurality of first subscriber substations and a first carrier current unit coupled to said carrier frequency signal circuit, said second exchange including second automatic switching apparatus and a plurality of second subscriber substations and a second carrier current unit coupled to said carrier frequency signal circuit, said first unit including first transmitting and receiving signal channels and first transmitting and receiving communication channels, said second unit including second transmitting and receiving signal channels and second transmitting and receiving communication channels, means responsive to initiation of a call at a calling one of said first subscriber substations for connecting said one calling first subscriber substation to said first switching apparatus, means responsive to a digit or digits dialed at said one calling first subscriber substation for operating said first switching apparatus to extend the connection to said first transmitting and receiving communication channels, means responsive to the extension of said last-mentioned connection for transmitting a first carrier frequency signal over said first transmitting signal channel, means responsive to said first carrier frequency signal in said second receiving signal channel for seizing said second switching apparatus, means responsive to another digit or digits dialed at said one calling first subscriber substation for transmitting pulses of said first carrier frequency signal corresponding to different digits over said first transmitting signal channel, means responsive to said pulses of said first carrier frequency signal corresponding to different digits in said second receiving signal channel for selectively operating said second switching apparatus to extend the call to a called one of said second subscriber substations, means responsive to answering of the call at said one called second subscriber substation for completing a connection therefrom to said second transmitting and receiving communication channels and for transmitting a second carrier frequency signal over said second transmitting signal channel, means responsive to said second carrier frequency signal in said first receiving signal channel for reversing the polarity of said connection to said one calling first subscriber substation, means responsive to an audio signal from said one calling first subscriber substation for transmitting a corresponding modulated signal of said first carrier frequency signal over said first transmitting communication channel, means responsive to said modulated signal of said first carrier frequency signal in said second receiving communication channel for transmitting a corresponding audio signal to said one called second subscriber substation, means responsive to an audio signal from said one called second subscriber substation for transmitting a corresponding modulated signal of said second carrier frequency signal over said second transmitting communication channel, and means responsive to said modulated signal of said second carrier frequency signal in said first receiving communication channel for transmitting a corresponding audio signal to said one calling first subscriber substation.

29. In a communication system: a carrier current transmitter and receiver; a circuit including two conductors connecting the same to a central office; a carrier relay responsive to carrier current incoming to said receiver; a transmitter relay for switching on carrier outgoing from said transmitter; a supervising relay at the central office; means including said carrier relay and one of the conductors of said circuit, for energizing said supervising relay in response to incoming carrier; and means including the other of the conductors of said circuit and switching means at the central office for energizing said transmitter relay to switch on the outgoing carrier.

30. In a communication system: a carrier current transmitter and receiver; a two-conductor circuit connecting the same to a central office; a carrier relay responsive to carrier current incoming to said receiver; a transmitter relay for switching on carrier current outgoing from said transmitter; a supervising relay at the central office; means including said carrier relay and one conductor of said two-conductor circuit, for energizing said supervising relay in response to incoming carrier; and means including the remaining conductor of said two-conductor circuit and switching means at the central office for energizing said transmitter relay to switch on the outgoing carrier.

31. In a communication system: a carrier current transmitter and receiver; a two-conductor circuit connecting the same to a central office; a carrier relay responsive to carrier current incoming to said receiver; a transmitter relay for switching on carrier outgoing from said transmitter; a supervising relay at the central office and a call lamp responsive thereto; means including said carrier relay and one conductor of said two-conductor circuit, for energizing said supervising relay and call lamp in response to incoming carrier; and means including the remaining said conductor, a jack having a sleeve conductor, a jack relay connected to said sleeve conductor and an operator's cord plug at the central office, for energizing said transmitter relay upon insertion of said plug in said jack, thereby to switch on carrier current outgoing from said transmitter.

32. In a two-way dial telephone signaling system for relaying signals between a low frequency wire circuit and a carrier wave circuit: a carrier wave transmitter and receiver; a carrier relay responsive to carrier current incoming to said receiver and to dialing interruptions thereof; a slow-release relay responsive to said carrier relay and unresponsive to dialing signals; a sequence relay energized by said slow-release relay for connecting said wire circuit to contacts of said carrier relay for repeating in said circuit the dialing pulse operation of the carrier relay; a line relay; means including release contacts of said sequence relay for connecting said line relay to said wire circuit, said line relay responding to dialing pulses incoming over said wire circuit; and means including said line relay for energizing said carrier wave transmitter, to transmit outgoing carrier and for interrupting the same in response to dialing signals incoming over the wire circuit.

IMRE MOLNAR.

REFERENCES CITED

The following references are of record in the file of this patent:

UNITED STATES PATENTS

| Number | Name | Date |
|---|---|---|
| 1,528,806 | Wilbur | Mar. 10, 1925 |
| 2,254,113 | Wicks | Aug. 26, 1941 |